US012465922B2

(12) United States Patent
Matlin

(10) Patent No.: US 12,465,922 B2
(45) Date of Patent: Nov. 11, 2025

(54) LUBRICANT SHEET FOR A SHREDDER

(71) Applicant: FELLOWES, INC., Itasca, IL (US)

(72) Inventor: Tai Hoon K. Matlin, Round Lake Beach, IL (US)

(73) Assignee: FELLOWES, INC., Itasca, IL (US)

( * ) Notice: Subject to any disclaimer, the term of this patent is extended or adjusted under 35 U.S.C. 154(b) by 333 days.

(21) Appl. No.: 18/115,193

(22) Filed: Feb. 28, 2023

(65) Prior Publication Data
US 2023/0278042 A1 Sep. 7, 2023

Related U.S. Application Data

(60) Provisional application No. 63/315,846, filed on Mar. 2, 2022.

(51) Int. Cl.
*B02C 23/06* (2006.01)
*B02C 18/00* (2006.01)
(Continued)

(52) U.S. Cl.
CPC .............. *B02C 23/06* (2013.01); *B02C 18/16* (2013.01); *F16N 25/00* (2013.01); *B02C 2018/166* (2013.01)

(58) Field of Classification Search
CPC ... B02C 23/06; B02C 18/16; B02C 2018/166; B02C 2018/0007; F16N 25/00; F16N 19/00; F16N 9/00
See application file for complete search history.

(56) References Cited

U.S. PATENT DOCUMENTS 7,344,096 B2  3/2008 Matlin et al.
7,631,823 B2  12/2009 Matlin et al.
(Continued)

FOREIGN PATENT DOCUMENTS

CN  202791262 U  3/2013
CN  112517186 A  3/2021
(Continued)

OTHER PUBLICATIONS

International Preliminary Report on Patentability issued in International Application No. PCT/US2023/014051, dated Sep. 12, 2024.
(Continued)

*Primary Examiner* — Mohammed S. Alawadi
(74) *Attorney, Agent, or Firm* — Pillsbury Winthrop Shaw Pittman, LLP

(57) ABSTRACT

A lubricant sheet comprises a blank of material folded along a fold line into a folded configuration to form a lubricant containment pocket; a lubricant in the lubricant containment pocket; and a primary barrier for the lubricant. The primary barrier extends around and seals the lubricant containment pocket to hold the lubricant in the lubricant containment pocket. The blank of material includes a fold of material along the fold line forming a secondary barrier for the lubricant. When the lubricant in the lubricant containment pocket is being compressed during shredding of the lubricant sheet so as to cause some of the lubricant to be released through the primary barrier, the secondary barrier is configured to deflect the released lubricant that is released towards the secondary barrier.

12 Claims, 25 Drawing Sheets

(51) Int. Cl.
  *B02C 18/16*      (2006.01)
  *F16N 9/00*       (2006.01)
  *F16N 19/00*      (2006.01)
  *F16N 25/00*      (2006.01)

(56) References Cited

U.S. PATENT DOCUMENTS

| | | | |
|---|---|---|---|
| 7,631,824 | B2 | 12/2009 | Matlin et al. |
| 7,635,102 | B2 | 12/2009 | Matlin et al. |
| 7,712,689 | B2 | 5/2010 | Matlin et al. |
| 7,793,876 | B2 | 9/2010 | Wang |
| 7,798,435 | B2 | 9/2010 | Matlin |
| 7,946,514 | B2 | 5/2011 | Matlin et al. |
| 7,946,515 | B2 | 5/2011 | Matlin et al. |
| 7,963,468 | B2 | 6/2011 | Matlin et al. |
| RE44,161 | E | 4/2013 | Matlin et al. |
| 8,708,261 | B2 | 4/2014 | Allen |
| 8,757,526 | B2 | 6/2014 | Matlin et al. |
| 8,783,592 | B2 | 7/2014 | Matlin et al. |
| 9,283,567 | B2 | 3/2016 | Hu et al. |
| 9,346,059 | B2 | 5/2016 | Jensen et al. |
| 9,573,135 | B2 | 2/2017 | Matlin et al. |
| 9,724,704 | B2 | 8/2017 | Matlin et al. |
| 9,751,673 | B2 | 9/2017 | Chang |
| 2005/0095354 | A1* | 5/2005 | Allen ............... B26D 7/088 162/158 |
| 2006/0243631 | A1* | 11/2006 | Duke ............... B02C 18/16 206/525 |
| 2007/0034724 | A1 | 2/2007 | Wang |
| 2007/0087942 | A1* | 4/2007 | Allen ............... B02C 18/0007 508/100 |
| 2018/0021787 | A1 | 1/2018 | Wang |
| 2018/0133718 | A1* | 5/2018 | Wang ............... B02C 18/0007 |
| 2019/0193127 | A1 | 6/2019 | Chang |

FOREIGN PATENT DOCUMENTS

| | | | | |
|---|---|---|---|---|
| GB | 2187238 | A * | 9/1987 | ............ F16N 19/00 |
| TW | M273394 | | 11/1993 | |

OTHER PUBLICATIONS

International Search Report and Written Opinion issued in International Application No. PCT/US2023/014051, dated Jun. 19, 2023.

* cited by examiner

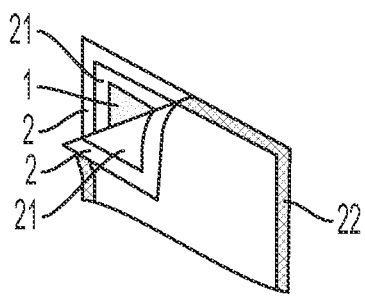 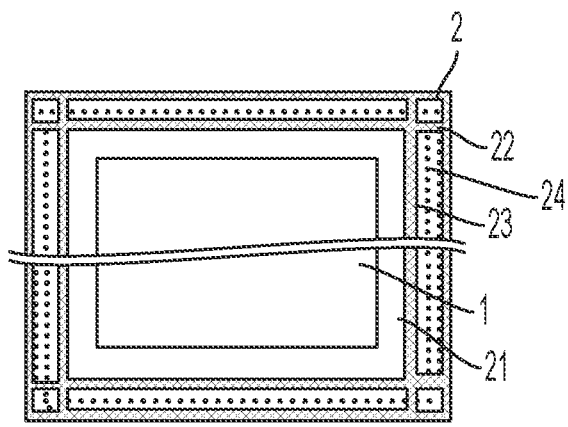
FIG. 19A
(PRIOR ART)
FIG. 19B
(PRIOR ART)

LUBRICANT SHEET FOR A SHREDDER

CROSS-REFERENCE TO RELATED APPLICATIONS

This application claims the benefit under 35 USC 119(e) of prior U.S. Provisional Patent Application Ser. No. 63/315,846, filed Mar. 2, 2022, which is hereby incorporated by reference in its entirety.

BACKGROUND

Field

The present patent application relates to shredders, and particularly lubricant sheets that are configured to be used in the shredders to provide lubrication to the shredders.

Description of Related Art

Shredders are well known devices for destroying articles, such as paper, documents, compact discs ("CDs"), expired credit cards, etc. Typically, users purchase shredders to destroy sensitive information bearing articles, such as credit card statements with account information, documents containing company trade secrets, etc.

A shredder may generally include a shredder mechanism contained within a housing that is removably mounted atop a container. The shredder mechanism typically includes a cutter mechanism with a series of cutter elements that shred articles fed into the shredder mechanism and discharge the shredded articles downwardly into the container. Examples of known shredders include: U.S. Pat. No. 9,724,704 titled "shredder thickness with anti-jitter feature"; U.S. Pat. Nos. 8,757,526 and 9,573,135 titled "shredder with thickness detector"; U.S. Pat. No. 7,798,435 titled "shredder with oiling mechanism"; U.S. Pat. No. 7,344,096 titled "shredder with lock for on/off switch"; U.S. Pat. No. 7,946,515 titled "shredder throat safety system"; U.S. Pat. No. 9,346,059 titled "shredder with vibration performance sensor and control system"; and U.S. Pat. No. 9,283,567 titled "shredder with jam proof system". These patents are commonly owned by the same assignee as the present patent application. The present patent application incorporates each of these patents by reference in their entirety.

As with other mechanical devices, wear in the shredder may be reduced and performance of the shredder may be maintained by proper lubrication of moving parts in the shredder. In particular, wear on cutter elements/blades of the shredder mechanism and load on the shredder motor may be reduced by oiling the cutter elements of the shredder mechanism.

Oiling or oil sheets are a convenient way to maintain the shredders. Prior to the use of these oil sheets, manual oiling into a paper feed throat of the shredder was the standard way to lubricate shredder's cutter mechanism. Some methods included directly dripping the oil/lubricant manually onto the shredders while other methods included oiling onto a sheet of paper and, as the sheet of paper begins to saturate, shred the sheet of paper in the cutter mechanism of the shredder. Other methods to maintain the cutter elements or cutter mechanism of the shredders with oil/lubricant include a variety of auto-oil systems as well.

One example of a known lubrication package is disclosed U.S. Pat. No. 7,793,876 ("the '876 patent"), the entirety of which is incorporated herein by reference. FIGS. 19A and 19B of the present patent application show the lubrication package of the '876 patent. As shown in FIGS. 19A and 19B of the present patent application, the '876 patent discloses a plurality of vents 24 that are arranged peripherally around the edges of the lubrication package between two spaced apart, parallel peripheral seals 22, 23. Because of the arrangement of peripheral seals 22, 23, the lubricant is retained within the lubrication package (e.g., the middle section) until it is shredded. During the shredding procedure, the section with the lubricant may also be compressed and rupture at a point outside the shredder, and the peripheral regions receive the lubricant. The vents 24 relieve built up pressure and direct the compressed air and any oil droplets into the shredding mechanisms. The '876 patent, thus, discloses the use of vent holes 24 within the sealed perimeter (e.g., seals 22, 23) and immediately outside the perimeter of the inner chamber saturated with lubricant. The vent holes 24 of the '876 patent are configured to allow the liquid lubricant to distribute immediately once the seal is broken as a means to reduce compression pressure that builds when the lubricant sheet 1 is being shred.

Another example of a known lubrication package is disclosed U.S. Pat. No. 9,751,673 ("the '673 patent"), the entirety of which is incorporated herein by reference. FIG. 20 of the present patent application shows the lubrication package of the '673 patent. As shown in FIG. 20 of the present patent application, the '673 patent discloses the use of multiple inner seals 31 that are not in contact with the perimeter seal to separate the interior area into at least two regions 42, 52, 62, etc. and 44, 54, 64, etc. The lubrication package of the '673 patent is, thus, configured to distribute the liquid lubricant within an inner sealed compartment to reduce compression of the lubricant against the outside seam (convoluted pathway for the liquid/lubricant).

Yet another example of a known lubrication package is disclosed U.S. Pat. No. 8,708,261 ("the '261 patent"), the entirety of which is incorporated herein by reference. The '261 patent includes a shell layer (e.g., shell layer 715 in FIG. 7A of the '261 patent) that provides mechanical stiffness and a means to evenly distribute the lubricant (the width and length of the single cavity) entrapped by the shell layer. Various embodiments of means for retaining an even distribution of a measured amount of lubricant are illustrated in FIGS. 1-7B of the '261 patent. Such means may include structures such as bubbles, tubes, and absorptive substrates as well as other lubrication substrates having properties configured for retaining the even distribution of a measured amount of lubricant. In some embodiments, the lubrication sheets include a composite of different agents that may or may not be separated into different compartments (e.g., tubes, bubbles, portions, layers) of the lubrication sheets. The even distribution of the '261 patent would not allow the lubricant to move and compress within the single cavity as to burst through seam with force when shredding.

The present patent application endeavors to provide various improvements over prior mentioned examples along with any similar examples that may not have been mentioned or included. The present patent application discloses an improved oiling/lubricant sheet that is configured to be used in shredders so as to provide lubrication between cutter elements of the shredder upon direct contact with the lubricant, for example, to extend the lifespan of the shredder.

SUMMARY

In one embodiment of the present patent application, a lubricant sheet that is configured to be used in a shredder to provide lubrication between cutter elements of the shredder is provided. The lubricant sheet comprises a blank of material, a lubricant, and a primary barrier for the lubricant. The blank of material is folded along a fold line into a folded configuration to form a lubricant containment pocket. The lubricant is in the lubricant containment pocket. The primary barrier for the lubricant extends around and seals the lubricant containment pocket so as to hold the lubricant in the lubricant containment pocket. The blank of material comprises a fold of material along the fold line forming a secondary barrier for the lubricant. When the lubricant in the lubricant containment pocket is being compressed during shredding of the lubricant sheet so as to cause some of the lubricant to be released through the primary barrier, the secondary barrier is configured to deflect the released lubricant that is released towards the secondary barrier so as to relieve pressure in the released lubricant and to maintain the released lubricant in place for further lubrication of the cutter elements of the shredder.

Implementations of the foregoing aspects may include one or more of the following features.

The blank of material may include peripheral portions extending peripherally around the primary barrier. The secondary barrier and the peripheral portion between the primary barrier and the secondary barrier may form a manifold for the released lubricant.

The manifold may be open on its lateral edges so as to equalize any pressure buildup of the released lubricant and so as to enable venting of the released lubricant along a longitudinal direction of the fold of material and in a plane of the blank of material.

The manifold may include directional seals that are configured to direct or deflect the released lubricant. The manifold may include directional seals that are configured to form a convoluted tortuous path for the released lubricant. The manifold may include additional pressure relieving vents that are configured to relieve the pressure in the released lubricant. The manifold may include additional material that is configured to absorb and redistribute the released lubricant so as to slow down or inhibit the flow of the released lubricant.

The fold of the material may be disposed between a first area of the blank of material and a second area of the blank of material. The first area and the second area may form surfaces of the lubricant containment pocket. Each of the first area and the second area may have edges. The edges of the first area and the edges of the second area may correspond to each other and may together form edges of the lubricant containment pocket. The primary barrier may be formed along the edges of the lubricant containment pocket.

The fold of material may be a first fold of material and the secondary barrier may be a first secondary barrier. The blank of material may include a second fold line that is disposed either above the first area of the blank of material or below the second area of the blank of material. The blank of material may include a second fold of material along the second fold line forming a second secondary barrier for the lubricant. The first secondary barrier and the second secondary barrier may be disposed on opposing longitudinal ends of the lubricant sheet.

The fold of material may be a first fold of material and the secondary barrier may be a first secondary barrier. The blank of material may include at least one additional fold over material portion protruding outwardly from at least one side of either an upper half of the blank of material or a lower half of the blank of material. The at least one additional fold over material portion may be folded over on to the blank of material along at least one additional fold line forming a second secondary barrier. The first secondary barrier and the second secondary barrier may be disposed on opposing longitudinal ends of the lubricant sheet.

The at least one additional fold over material portion may include three additional fold over material portions, the at least one additional fold line may include three additional fold lines, and the at least one side may include three sides. Each of the three additional fold over material portions may protrude outwardly from a corresponding side of either the upper half of the blank of material or the lower half of the blank of material and may be folded over on to the blank of material along a corresponding additional fold line forming the second secondary barrier, a third secondary barrier, and a fourth secondary barrier, respectively. The third secondary barrier and the fourth secondary barrier may be disposed on opposing transverse ends of the lubricant sheet.

In another embodiment of the present patent application, a lubricant sheet assembly is configured to be used in a shredder to provide lubrication between cutter elements of the shredder. The lubricant sheet assembly comprises at least two blanks of material overlapping each other to form a lubricant containment pocket; a lubricant in the lubricant containment pocket; and a primary barrier for the lubricant, the primary barrier extending around and sealing the lubricant containment pocket so as to hold the lubricant in the lubricant containment pocket. At least one of the blanks of material folded along a fold line and comprising a fold of material along the fold line forming a secondary barrier for the lubricant. When the lubricant in the lubricant containment pocket is being compressed during shredding of the lubricant sheet assembly so as to cause some of the lubricant to be released through the primary barrier, the secondary barrier is configured to deflect the released lubricant that is released towards the secondary barrier so as to relieve pressure in the released lubricant and to maintain the released lubricant in place for further lubrication of the cutter elements of the shredder.

These and other aspects of the present patent application, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which

FIG. 10 shows the cut down edge, FIG. 11 shows a fold over edge, and FIG. 12 shows a loosely taped fold over edge;

FIGS. 19A and 19B show a prior art lubrication package; and

DETAILED DESCRIPTION OF THE DRAWINGS

Figure 1:
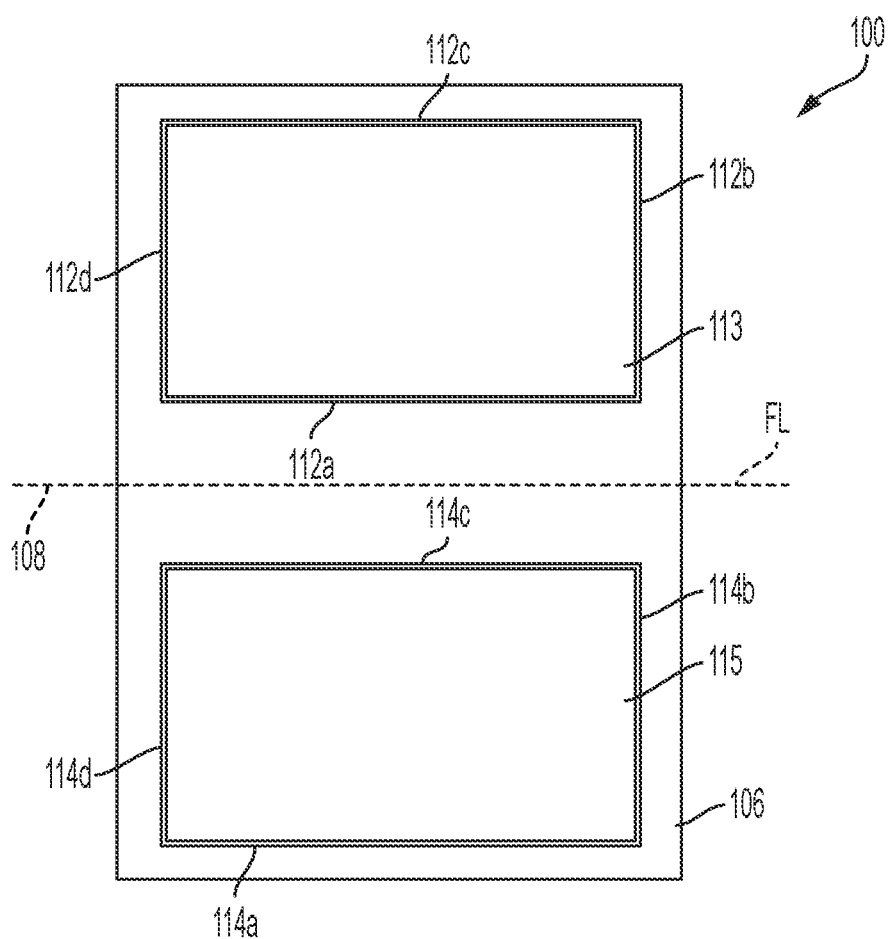
FIG. 1 shows a lubricant sheet assembly in accordance with an embodiment of the present patent application, where the lubricant sheet assembly includes a cavity that is configured to sealed so as to hold a lubricant therein and a fold of material that is configured to form a secondary barrier for any lubricant breaking through the seal of the cavity, and where the lubricant sheet assembly is in an initial, unfolded configuration.
Figure 2:
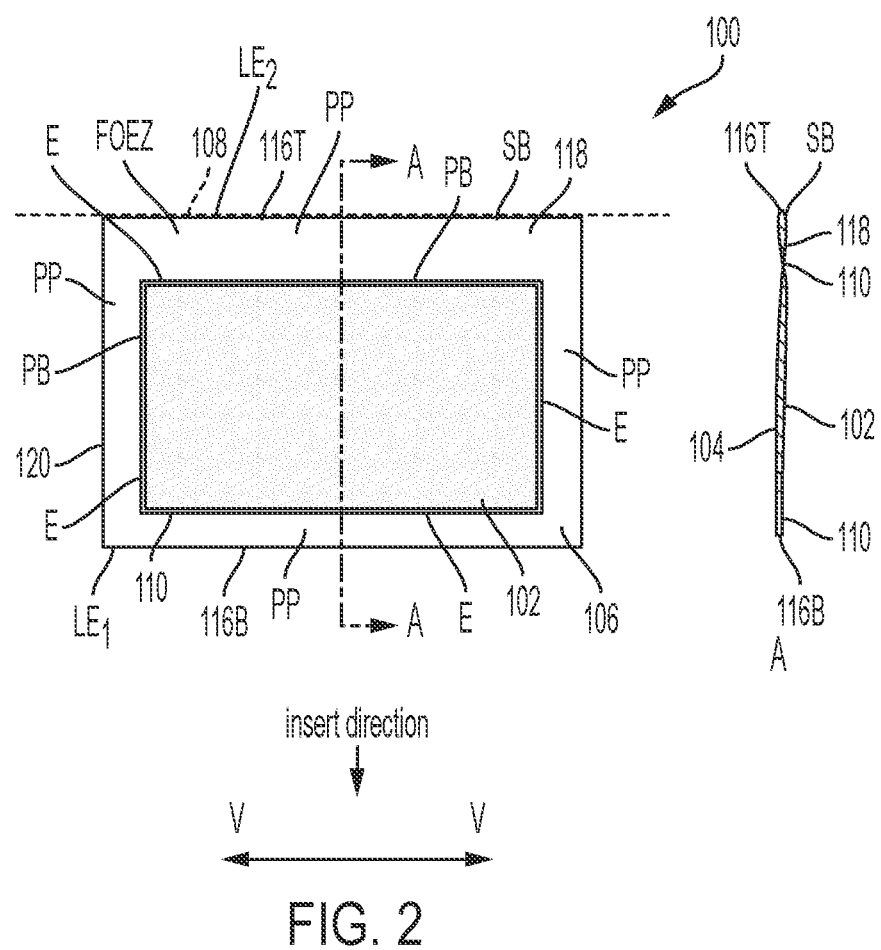
FIG. 2 shows the lubricant sheet assembly of FIG. 1 in a folded and sealed configuration.

FIGS. 1 and 2 show a lubricant sheet assembly 100 in accordance with an embodiment of the present patent application. The lubricant sheet assembly 100 may include an initial, unfolded configuration as shown in FIG. 1 and a folded and/or sealed configuration as shown in FIG. 2. The lubricant sheet assembly 100, when in the folded, sealed configuration, may be interchangeably referred to as lubricant sheet 120, oiling/oil sheet 120. The lubricant sheet 120 may be configured to be used in a shredder (not shown) so as to provide lubrication between cutter elements of the shredder upon direct contact with a lubricant 104 so as to, for example, extend the lifespan of the shredder. Unlike the prior art disclosed in the background section, the lubricant sheet assembly 100 is configured to fold over (e.g., fold over at the meridian of the sheet blank) so as to create a fold as will be described in detail in the various embodiments below. The fold may act as a deflector/splash shield for the lubricant 104 that sometimes compresses during the shredding of the lubricant sheet 120 causing the lubricant 104 to burst through a sealed seam 110 and be forced upwards towards the fold.

Figure 2A:
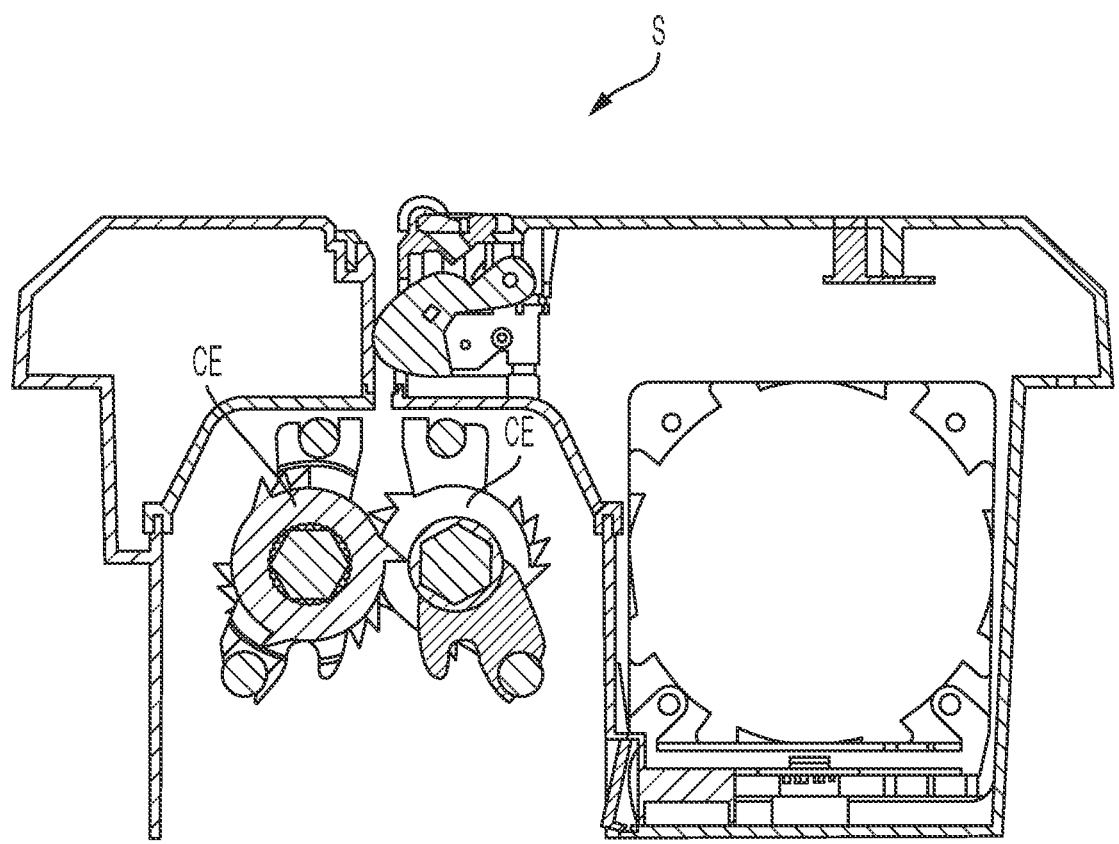
FIG. 2A shows a cross-sectional view of a portion of a shredder along with cutter elements/cutter assembly of the shredder in accordance with an embodiment of the present patent application.
Figure 2B:
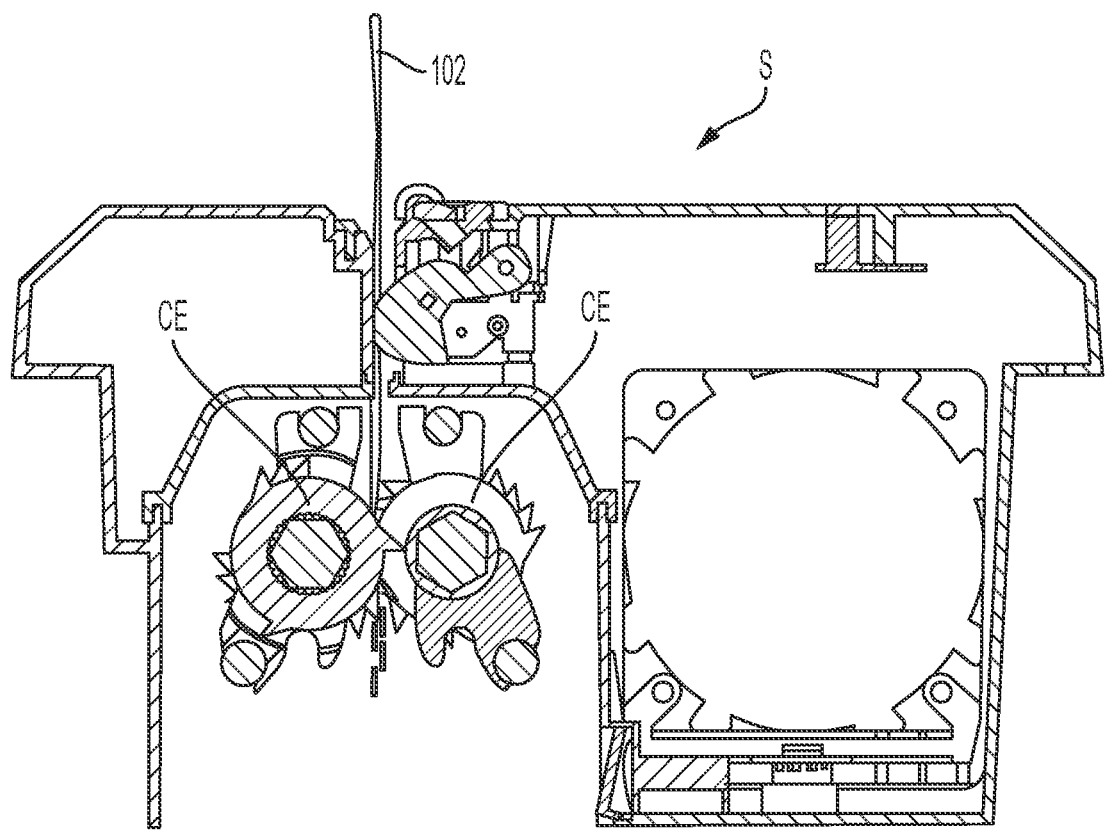
FIG. 2B shows a cross-sectional view of the portion of the shredder in FIG. 2A, with a lubricant sheet being inserted therein to provide lubrication between the cutter elements of the shredder.

In one embodiment, referring to FIGS. 2A and 2B, the lubricant sheet 120 is configured to be used in a shredder S to provide lubrication between cutter elements CE of the shredder S. FIG. 2A shows a cross-sectional view of a portion of the shredder S along with cutter elements CE/cutter assembly of the shredder S, while FIG. 2B shows a cross-sectional view of the portion of the shredder S in FIG. 2A, with the lubricant sheet 120 being inserted therein to provide lubrication between the cutter elements CE of the shredder S. The shredder S may include any shredder. For example, the shredder S may be shredders, which are commonly owned by the same assignee as the present patent application and have been incorporated by reference in their entirety in (the background section of) the present patent application.

The lubricant sheet 120 comprises a blank 106 of material, a lubricant 104, and a primary barrier PB/110 for the lubricant 104. The blank 106 of material is folded along a fold line (e.g., dashed line in FIG. 1) into a folded configuration to form a lubricant containment pocket 102. The lubricant 104 is in the lubricant containment pocket 102. The primary barrier PB/110 for the lubricant 104 extends around and seals the lubricant containment pocket so as to hold the lubricant 104 in the lubricant containment pocket 102. The blank 106 of material comprises a fold 108 of material along the fold line forming a secondary barrier SB/108 for the lubricant 104. When the lubricant 104 in the lubricant containment pocket 102 is being compressed during shredding of the lubricant sheet 120 so as to cause some of the lubricant 104 to be released through the primary barrier PB/110, the secondary barrier SB/108 is configured to deflect the released lubricant that is released towards the secondary barrier SB/108 so as to relieve pressure in the released lubricant and to maintain the released lubricant in place for further lubrication of the cutter elements of the shredder.

The fold line may be on any edge/any edge portion of the blank 106 of material. The edge portion may include a portion of the blank 106 of material that is adjacent to the edge of the blank 106 of material. The fold line may be at the center of the blank 106 of material. The fold line may be between the center of the blank 106 of material and any edge/any edge portion of the blank 106 of material. That is, the fold line may be offset from either the center of the blank 106 of material or any edge/any edge portion of the blank 106 of material. The fold line may extend either longitudinally or transversely along the blank 106 of material. The fold over, as used in the description of the present patent application, may be a crease as well as a soft radius.

As shown in FIG. 2, the lubricant sheet assembly 100 may include the internal cavity 102 that is configured to hold the lubricant 104 therein. The cavity 102 may be configured to be sealed so as to hold the lubricant 104 therein. The lubricant 104 may be a fluid/liquid lubricant. The lubricant 104 may be oil, such as soybean oil, vegetable oil, mineral oil or other oils. Other lubricants may be used, including powered lubricants and other types of liquid lubricants. The lubricant may also be embedded in a sheet of porous material disposed within the cavity 102 as well. The cavity 102 may be interchangeably referred to as lubricant holding pocket or lubricant containment pocket.

The lubricant sheet assembly 100 may include the blank of material 106 that may be sealed in a manner (e.g., described in embodiments the present patent application) to create the cavity 102. The blank 106 of material, shown in FIG. 1, may be used to form the lubricant sheet 120, shown in FIG. 2, that is used to provide lubrication in the shredders. The material 106 may include a non-absorbing material. In other embodiments, the material 106 may include an absorbing material. The material 106 may be interchangeably referred to as shell layer. The material 106 may include a first area 113 of the material 106 and a second area 115 of the material 106 on opposing sides of the fold line. The material 106 may include additional peripheral areas surrounding the first area 113 and the second area 115.

As will be discussed in detail below, the first area 113 and the second area 115 of the material 106 may be configured to form the major sides/surfaces of the cavity 102. The first area 113 of the material 106 may include sides/edges 112a, 112b, 112c, 112d, and the second area 115 of the material 106 may include sides/edges 114a, 114b, 114c, 114d. Also, as will be discussed in detail below, the sides/edges 112a, 112b, 112c, 112d of the first area 113 and the sides/edges 114a, 114b, 114c, 114d of the second area 115 of the material 106 may be configured to form the sides/edges of the cavity 102. In other embodiments, the edges 112a-112d, 114a-114d may be provided on the blank 106 as ridges and/or depressions, which may be formed by any means, such as embossing, stamping, etc. to assist with sealing. As will be discussed below, in some embodiments, the edges 112a-112d, 114a-114d may not be initially present on the blank 106 and may be formed during manufacturing, such as by sealing, placement of adhesives, etc.

The fold 108 of the material may be disposed between the first area 113 of the blank of material and the second area 115 of the blank of material. The first area 113 and the second area 115 may form surfaces of the lubricant containment pocket 102. Each of the first area 113 and the second area 115 may have edges 112a-112d, 114a-114d. The edges 112a-112d of the first area 113 and the edges 114a-114d of the second area 115 may correspond to each other and may together form edges E of the lubricant containment pocket 102. The primary barrier PB/110 may be formed along the edges E of the lubricant containment pocket 102.

The lubricant sheet assembly 100 may include the seal 110 that forms the cavity 102 (and is disposed around the cavity 102). The seal 110 may interchangeably referred to as a primary barrier PB for the lubricant 104 that is being held in the cavity 102. The seal 110 may be a peripheral seal that is configured to extend around the cavity 102 so as to hold the lubricant 104 in the cavity 102. The seal 110 may include a heat-sealed perimeter that creates the cavity 102 that entraps the lubricant 104 therein. The seal 110 can also be formed by other means, such as a pressure sensitive adhesive, ultrasonic welding, or the like. The seal 110 may be formed along the sides/edges 112a, 112b, 112c, 112d of the first area 113 and the sides/edges 114a, 114b, 114c, 114d of the second area 115 so as to connect the corresponding the sides/edges (e.g., 112a to 114a, 112b to 114b, 112c to 114c, 112d to 114d) of the first area 113 and the second area 115 to each other and to form the cavity 102 therebetween.

Figure 5:
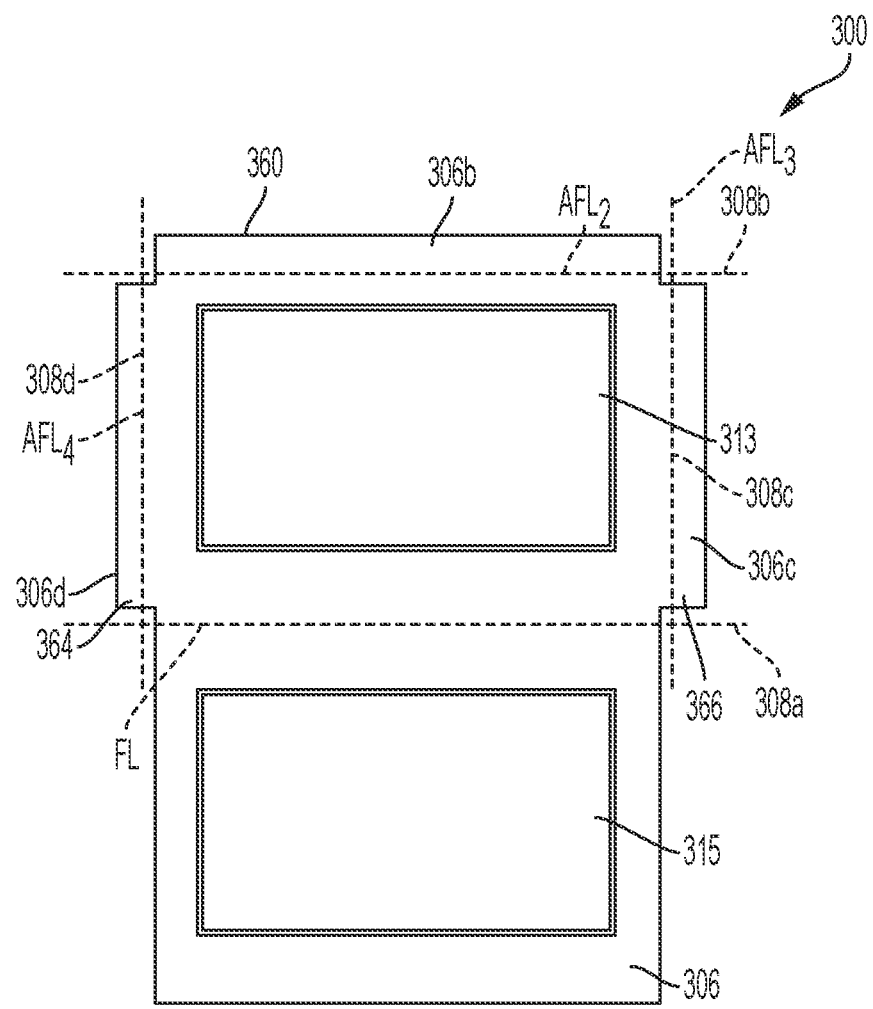
FIG. 5 shows a lubricant sheet assembly in accordance with yet another embodiment of the present patent application, where the lubricant sheet assembly is similar to that shown in FIG. 1-2 or 3-4 but includes four folds of material that are configured to form secondary barriers for any lubricant breaking through the seal of the cavity, and where the lubricant sheet assembly is in an initial, unfolded configuration.
Figure 6:
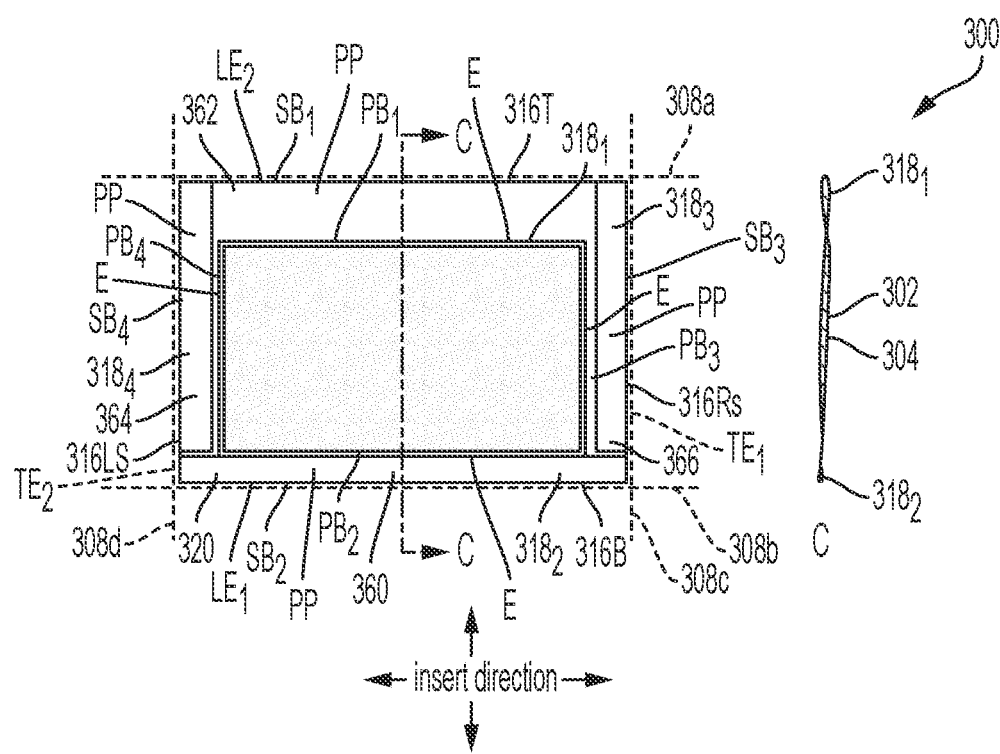
FIG. 6 shows the lubricant sheet assembly of FIG. 5 in a folded and sealed configuration.

The lubricant sheet assembly 100 may include a fold 108 of material. The fold 108 of material is shown as a dotted line in FIG. 1. The fold 108 is where continuous or integral material from the two opposing sides of the blank 106 meet at the point of folding. The fold 108 of material may be configured to form a secondary barrier SB for any lubricant 104 breaking through the seal 110 of the cavity 102. The fold 108 may be interchangeably referred to as fold line, the secondary barrier SB, etc. The first area 113 and the second area 115 may be disposed on either side of the fold 108. The fold 108 of material may be created from the same material as the shell layer 106. The fold 108 of material may be created from an additional material (e.g., as shown in FIGS. 5-6).

FIG. 2 shows the lubricant sheet assembly 100 in the folded and sealed configuration. The lubricant sheet assembly 100, when in the folded configuration, may have dimensions of 8.5 inches by 6 inches. That is, the lubricant sheet 120, shown in FIG. 2, may have dimensions of 8.5 inches by 6 inches. Any other dimensions may be used, and this example is not limiting.

The lubricant sheet assembly 100 may be first folded along the fold line 108 such that the first area 113 of the material 106 may overlap or coincide with the second area 115 of the material 106. The lubricant sheet assembly 100 may then be sealed (e.g., using heat seals/sealing or other forms of sealing) to form the cavity 102. That is, the seal 110 may be formed along the sides/edges 112a, 112b, 112c, 112d of the first area 113 and the sides/edges 114a, 114b, 114c, 114d of the second area 115 so as to connect the corresponding the sides/edges (e.g., 112a to 114a, 112b to 114b, 112c to 114c, 112d to 114d) of the first area 113 and the second area 115 to each other and to form the cavity 102 therebetween.

Optionally, the outermost lateral edges of the blank 106 are left unsealed. As will be discussed, this configuration allows lubricant escaping upwardly from the cavity 102 rupturing to be directed laterally by the folded shield. In some embodiments, just the upper parts of the outer lateral edges, such as between the fold and upper edge of the cavity 102, may be left unsealed, with the remainder sealed. The bottom edge (i.e., opposite the fold) may also be left unsealed as an option.

The lubricant sheet assembly 100 may include an opening in the sealed perimeter to add the lubricant 104 into the cavity 102. That is, the cavity 102 may not be completely sealed (initially) so as to add the lubricant 104 into the cavity 102. The opening in the sealed perimeter may be sealed after the addition of the lubricant 104 into the cavity 102. The sealing of the opening may be a final seal to entrap the lubricant 104 in the cavity 102.

FIG. 2 shows an insertion direction of the lubricant sheet 120 into the shredder. That is, bottom edge 116B of the lubricant sheet 120 may be first inserted into the shredder. The bottom insert edge 116B of the lubricant sheet 120 may be a non-folded edge of the lubricant sheet assembly 100. The cross-sectional view A (i.e., cross-sectional view taken along an axis A-A) of FIG. 2 clearly shows the seal area 110 and the cavity 102 created by the seals 110.

The cross-sectional view A of FIG. 2 also represents the fold 108 being disposed at top edge/side 116T of the lubricant sheet 120. That is, the secondary barrier SB of the lubricant sheet assembly 100 is disposed at the top edge/side 116T of the lubricant sheet 120. The secondary barrier SB or fold 108 may be open on the edges (e.g., side edges) so as to equalize any pressure build up. The assembled (folded and heat-sealed) view and cross-sectional view A of FIG. 2 illustrates the fold 108 at the top edge 116T is open on the edges so as to create the internal vent or distribution manifold or zone 118.

The blank 106 of material may include peripheral portions PP (as shown in FIG. 2) extending peripherally around the primary barrier PB/110. The secondary barrier SB/108 and the peripheral portion PP between the primary barrier PB/110 and the secondary barrier SB/108 may form the manifold 118 for the released lubricant. The manifold 118 may be open on its lateral edges so as to equalize any pressure buildup of the released lubricant and so as to enable venting of the released lubricant along a longitudinal direction (e.g., see along axis V-V in FIG. 2) of the fold 108 of material and in a plane of the blank of material.

As will be described in detail in the discussion of the present patent application, the manifold 118 may include directional seals that are configured to direct or deflect the released lubricant. The manifold 118 may include directional seals that are configured to form a convoluted tortuous path for the released lubricant. The manifold 118 may include additional pressure relieving vents that are configured to relieve the pressure in the released lubricant. The manifold 118 may include additional material that is configured to absorb and redistribute the released lubricant so as to slow down or inhibit the flow of the released lubricant.

The vent manifold 118 of the present patent application is different from the peripheral vent holes of the prior art lubricant sheets. For example, vent manifold 118 of the present patent application is open on the side edges that enable venting in the direction along the line V-V. By contrast, the peripheral vent holes of the prior art lubricant sheets enable venting in the direction perpendicular to the direction of the line V-V and in the direction perpendicular to the plane of this paper/document outside the lubrication sheet and onto its main face.

The tips of the cutter elements of the shredder may protrude outwardly and may be sharp so as to pierce the stack of paper being inserted into the shredder. The piercing tips of the cutter elements may be the ones that would get dull first. The piercing tips of the cutter elements may, therefore, be lubricated properly/well. The venting manifold of the present patent application keeps the lubricant in place so as to encourage further lubrication of these piercing tips of the cutter elements of the shredder as they penetrate sequentially into the space created by the secondary barrier (fold). The prior art vent holes (e.g., the vent holes of the '876 patent) simply vent oil/lubricant out more indiscriminately. In the prior art lubricant sheet (e.g., the '876 patent), the lubricant may leak from the peripheral holes and may fall on the parts/components of the shredder. In the present patent application, the lubricant may leak from the side holes (and may be guarded by the fold) so the leaked lubricant may have to travel a longer path to reach the parts/components of the shredder.

As shown in FIG. 2, in the folded and sealed configuration of the lubricant sheet assembly 100, the fold with vent manifold 118 may act as a deflector/splash shield for the lubricant 104 that sometimes compresses during the shredding of the lubricant sheet 120 causing the lubricant 104 to burst through the sealed seam 110 with a force so as to splash or squirt upwards towards the fold line 108.

The fold over edge 116T with the open lateral ends may also have additional pressure dissipation slits, convoluted pathways so as to create the secondary barrier SB for the lubricant 104, which passes through the initial sealed perimeter 110 that creates the lubricant holding pocket 102.

If the fold 108 or the secondary barrier SB may be significantly further away from the primary barrier 110/PB that creates the cavity 102 for the lubrication 104, this may allow for the cutting tips of the shredder to pierce the material between the two barriers PB, SB so as to create pressure relieving cuts into the lubricant sheet 120 prior to it entering the highest compression zone of the cutting block of the shredder. The highest compression zone may create the greatest cutter teeth compression on the lubrication sheet 120 and the lubricant 104 within the sealed pocket 102.

The fold over edge zone FOEZ may also have additional features such as directional heat seals (or seals formed by other means) that are configured direct the lubricant 104 once it has breached the initial containment seal 110. Other options include embossed or integrally formed ridges on the inside the surface of the blank 106. Another feature could be a carrier sheet that is configured to absorb the lubricant 104 and help to dispense the lubricant 104 onto the metal cutting tips and disk of the shredder. Furthermore, this additional material may have other properties so as to sharpen the metal and/or may be additional type of lubricant like oil impregnated wax, graphite, iron oxide types of materials.

The shredder S may include a thickness sensor and an infrared (IR) sheet sensor. The thickness sensor and the infrared IR sheet sensor are each described in detail in U.S. Pat. Nos. 7,635,102; 7,631,823; 7,631,824; 7,712,689; 7,946,514; 7,963,468; 8,783,592; RE44161 and 8,757,526, which are commonly owned by the same assignee as the present patent application and have been incorporated by reference in their entirety. The thickness sensor may be used in conjunction with the IR sheet sensor. The thickness sensor may be used independent of the IR sheet sensor. The thickness sensor, either with or without the IR sheet sensor, is configured to determine when the lubrication sheet 120 has been shredded. This may be due to a purposefully created undulation pattern, when the lubrication sheet 120 is being shredded, that is recognized by the thickness sensor within the noted shredding time as sensed by the IR sensor.

Figure 3:
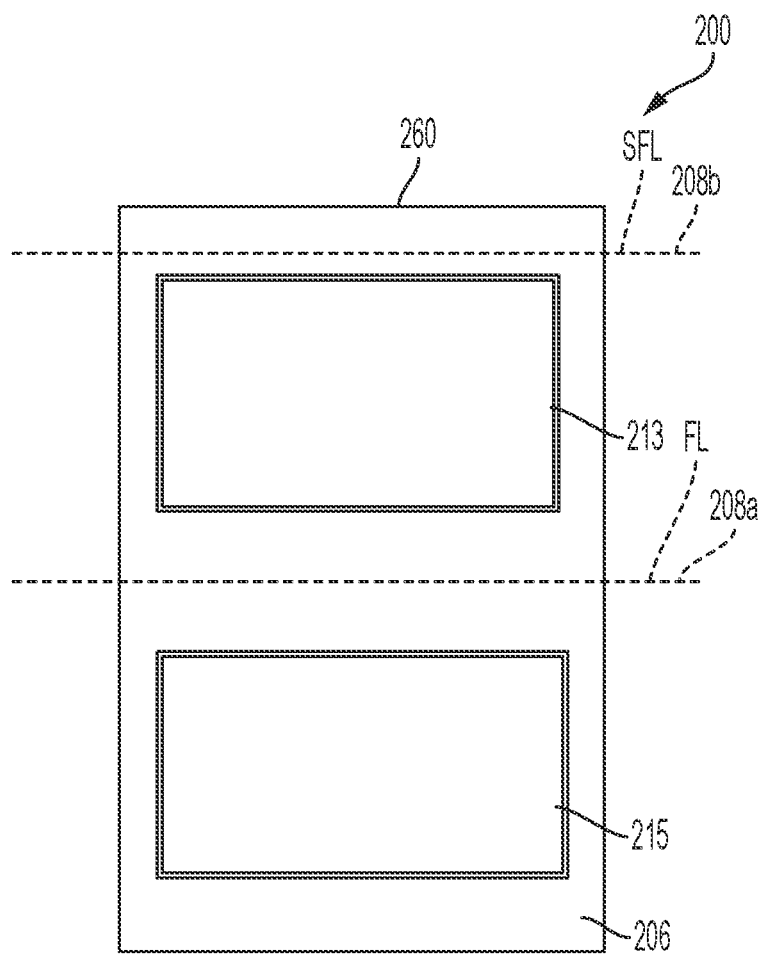
FIG. 3 shows a lubricant sheet assembly in accordance with another embodiment of the present patent application, where the lubricant sheet assembly is similar to that shown in FIGS. 1-2 but includes two folds of material that are configured to form secondary barriers for any lubricant breaking through the seal of the cavity, and where the lubricant sheet assembly is in an initial, unfolded configuration.
Figure 4:
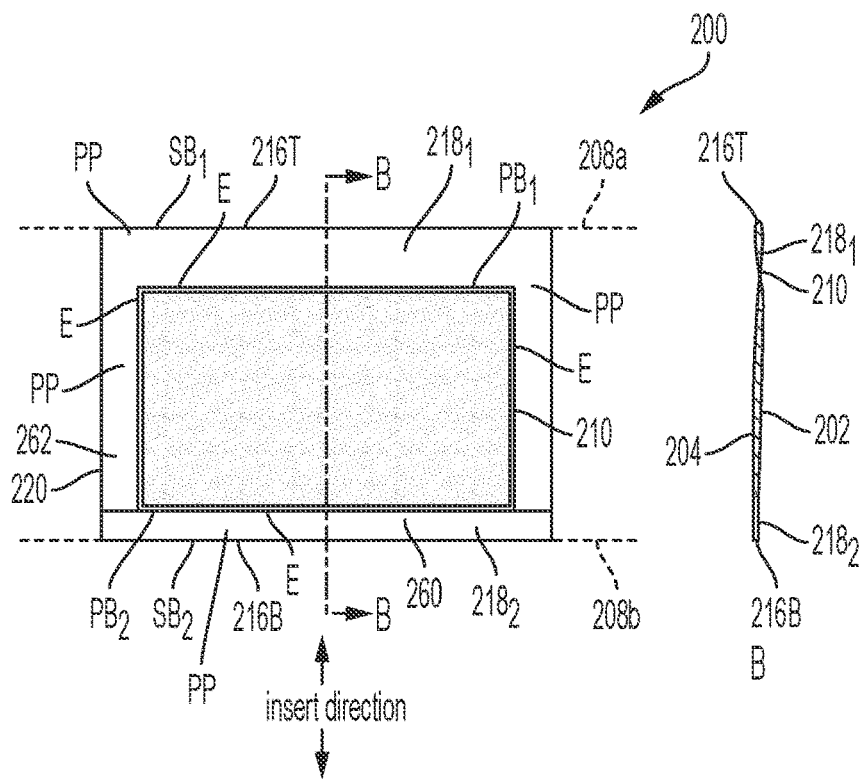
FIG. 4 shows the lubricant sheet assembly of FIG. 3 in a folded and sealed configuration.

FIGS. 3 and 4 show a lubricant sheet assembly 200 in accordance with another embodiment of the present patent application. The lubricant sheet assembly 200 is similar to that shown in FIGS. 1-2 except for the differences noted below. For example, the lubricant sheet assembly 200 may include an additional fold over-barrier represented by the dotted fold line 208b. This additional fold 208b may be configured to allow the lubricant sheet 220 to be inserted into the shredder with either of the long edges 216B, 216T inserted first since both long edges 216B, 216T have splash guard barriers $SB_1$, $SB_2$ that create a pressure dispersing manifold $218_1$, $218_2$. Each of the fold over edges may be open on their right and left edges, similarly to the embodiment of FIGS. 1-2.

Referring FIGS. 3-4, the lubricant sheet assembly 200 may include two folds 208a, 208b of material that are configured to form secondary barriers $SB_1$, $SB_2$ for any lubricant 204 breaking through the seal 210 of the cavity 202. In the illustrated embodiment, the additional fold 208b is shown and disposed above the fold 208a (i.e., disposed/positioned between first area 213 and second area 215 of material 206) such that the fold 208a may form the secondary barrier $SB_1$ at the top long edge 216T and the fold 208b may form the secondary barrier $SB_2$ at the bottom long edge 216T. In another embodiment, the additional fold 208b may be disposed below the fold 208a. In such an embodiment, the fold 208a may form the secondary barrier $SB_2$ at the bottom long edge 216B and the fold 208b may form the secondary barrier $SB_1$ at the top long edge 216T.

In one embodiment, referring to FIGS. 3-4, the material 260 of the sheet 206 adjacent the fold 208b may be folded onto portions 262 of the lubricant sheet 220. The material 260 of the sheet 206 may then be sealed to the lubricant sheet 220 using adhesives, tapes, heat seals, or other types of seals.

FIG. 4 also shows the insertion directions of the lubricant sheet 220 into the shredder. That is, either of the long edges 216B and 216T of the lubricant sheet 220 may be inserted into the shredder. Both insertion edges 216B and 216T of the lubricant sheet 120 may be folded edges of the lubricant sheet assembly 100.

The cross-sectional view B (i.e., cross-sectional view taken along an axis B-B) in FIG. 4 also illustrates how the additional fold 208b may be added so the lubricant sheet 220 may be inserted into the shredder on the two long edges 216B, 216T of the lubrication sheet 220 due to the venting manifold features $218_1$, $218_2$ now residing on the two long edges 216B, 216T. As discussed above, the venting manifold feature $218_1$, $218_2$ may include folded edges beyond the sealed edges $PB_1$, $PB_2$ of the oil/lubricant pocket 202. As may be seen by the cut-away view in FIG. 4, air may enter the venting manifolds $218_1$, $218_2$ from the sides.

Similar to the embodiment in FIGS. 1-2, cuts into the fold may add additional pressure relieving vents, heat sealed patterns may redirect the released lubricant 204 and additional material to absorb and redistribute the released lubricant 204 may be added in the venting manifolds $218_1$, $218_2$ between the initial barriers $PB_1$ or $PB_2$ and the secondary barriers $SB_1$ or $SB_2$.

The fold of material may be a first fold (e.g., 208a) of material and the secondary barrier SB may be a first secondary barrier 208a. The blank 106 of material may include a second fold line SFL that is disposed either above the first area 113 of the blank of material or below the second area 115 of the blank 106 of material. For example, in FIG. 3, the second fold line SFL is disposed above the first area 113 of the blank 106 of material. The blank 106 of material may include a second fold 208b of material along the second fold line SFL forming a second secondary barrier SB/208b for the lubricant. The first secondary barrier 208a and the second secondary barrier 208b may be disposed on opposing longitudinal ends $LE_1$, $LE_2$ of the lubricant sheet.

Figure 4A:
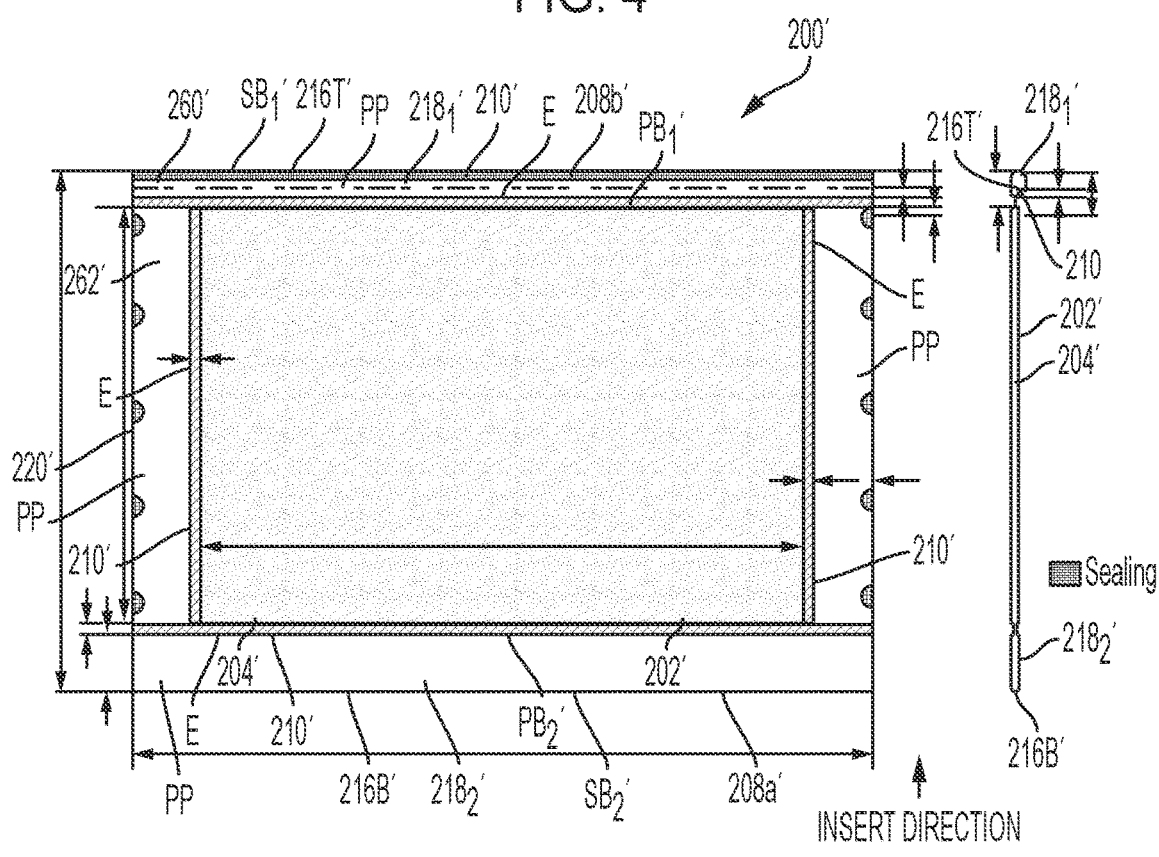
FIG. 4A shows a lubricant sheet assembly in a folded and sealed configuration in accordance with another embodiment of the present patent application.

FIG. 4A shows a lubricant sheet assembly 200' in a folded and sealed configuration in accordance with another embodiment of the present patent application. The lubricant 204' is entrapped in the lubricant containment pocket 202' and is sealed by the primary barrier/heat seals 210'. FIG. 4A is similar to FIG. 4 except for the differences noted below. In FIG. 4A, the lower portion is a fold over of the main blank and the upper portion being a short fold over of the remaining end. Both ends of the fold overs (e.g., manifolds $218_1$', $218_2$') open to allow air to pass out the sides as the lubricant sheet 220' is being shredded (with the fold line providing the splash shield/guard).

In another embodiment, a lubricant sheet assembly may have lower edge heat sealed and the upper being a single tab over fold on top. For example, two sheet blanks may be sealed together with one of them with a tab overhang that creates the fold over splash shield. Similar to FIG. 4A, but the lower fold is eliminated and replaced with the two sheet blanks aligning together on both the lower and the side edges. The lower and the side edges of the two sheet blanks are heat sealed together. The lubricant is then inserted and the upper tab folded over and sealed.

Figure 18A:
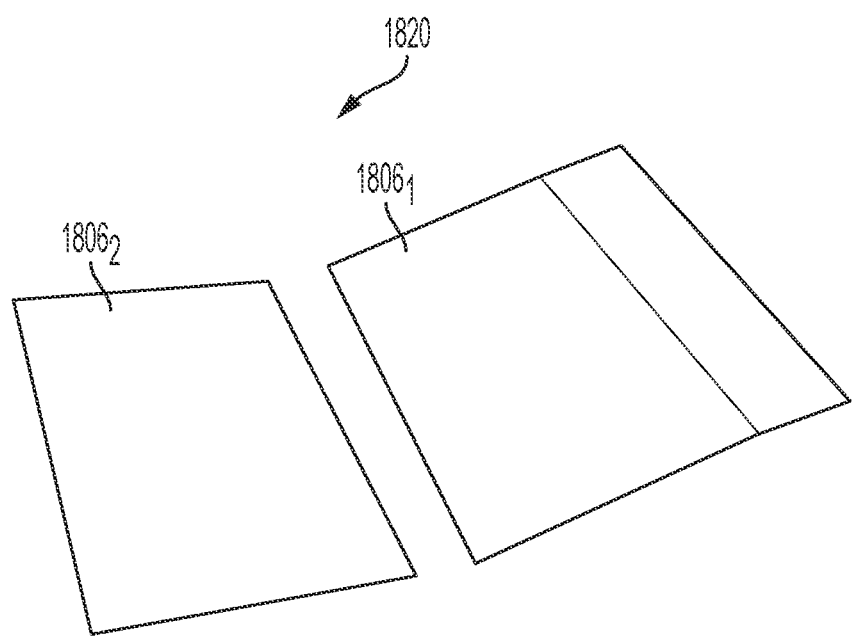
FIG. 18A shows a lubricant sheet assembly with two blanks in accordance with an embodiment of the present patent application.
Figure 18B:
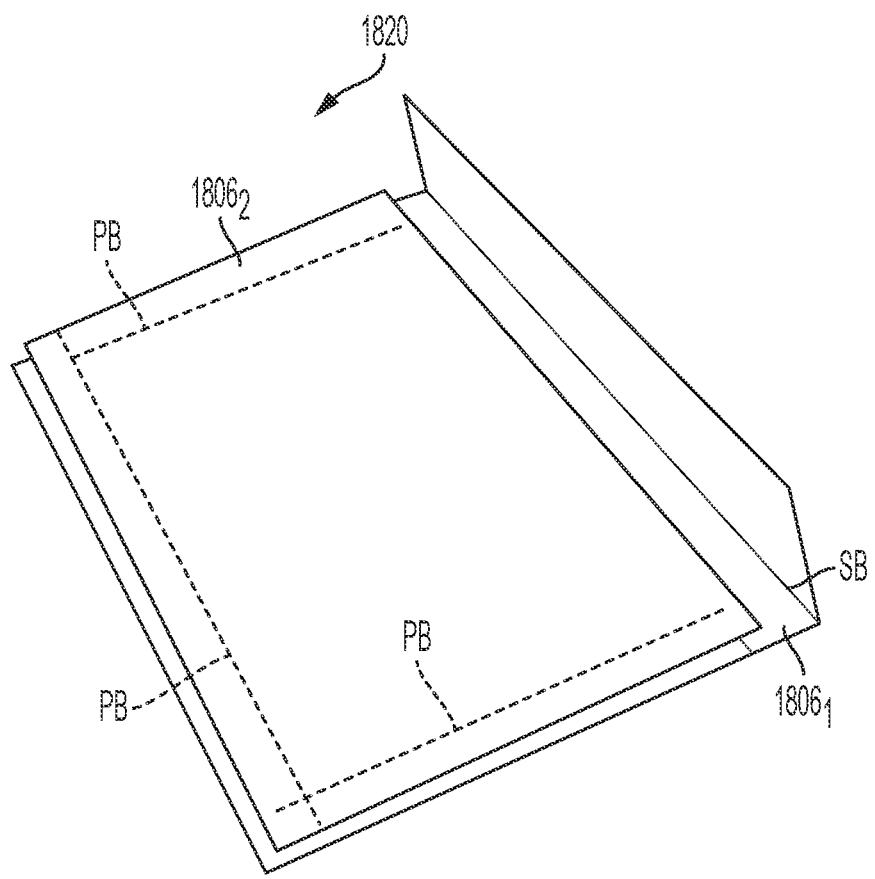
FIG. 18B shows the two blanks disposed overlapping each other (and heat sealed) to form a lubricant containment pocket in accordance with an embodiment of the present patent application.
Figure 18C:
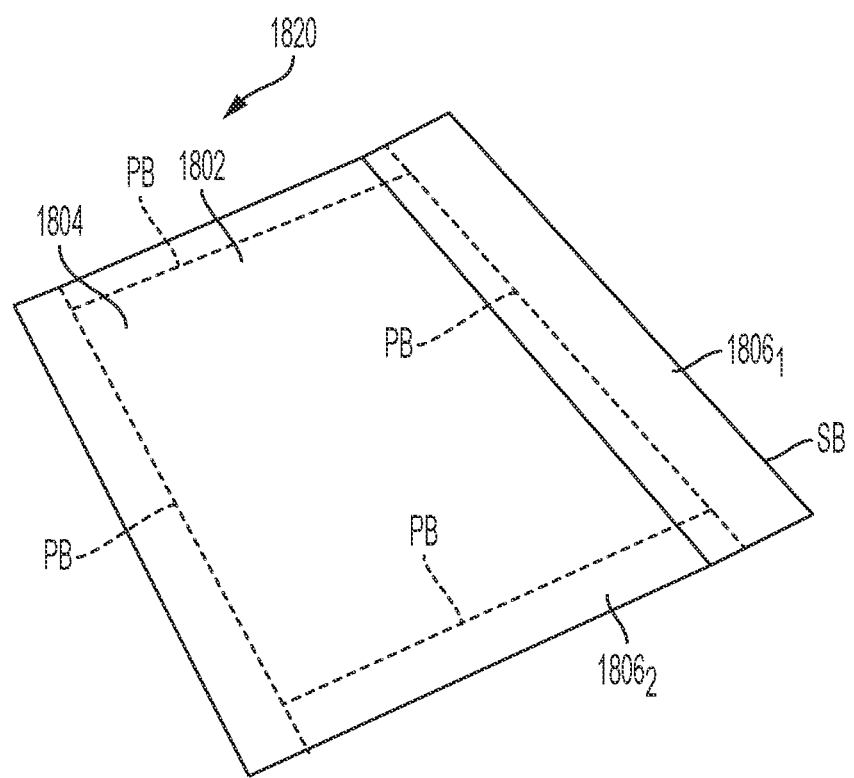
FIG. 18C shows the two blank configuration lubricant sheet prior to the final seal (i.e., after putting in the oil/lubricant into the lubricant containment pocket) in accordance with an embodiment of the present patent application.
Figure 20:
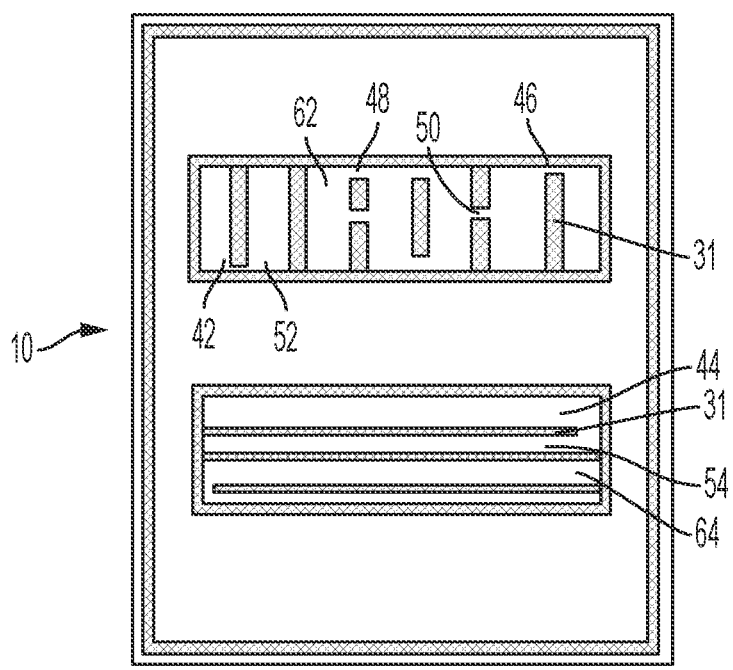
FIG. 20 shows another prior art lubrication package.

For example, in one embodiment, referring to FIGS. 18A-18C, the blank for the lubricant sheet may be made from two parts or portions vs. one blank folded over (or with a multitude of folds). With the two blank configuration, the two blanks are positioned overlapping each other to form the lubricant containment pocket.

In one embodiment, both side edges, and one of the top edge and the bottom edge overlap. The two blanks are then heat sealed along the side edge portions, and one of the top edge portion and the bottom edge portion while leaving the other of the top edge portion and the bottom edge portion open to receive the lubricant therethrough. In another embodiment, the two blanks are positioned overlapping each other such that both the top edge, the bottom edge and one of the side edges overlap. The top edge portion, the bottom edge portion and one of the side edge portions may be heat sealed while leaving the other of the side edge portions open to receive the lubricant therethrough. The last (remaining) edge is configured to overlap with the two blank configuration lubricant sheet to create the fold over prior to the final seal (i.e., after putting in the oil/lubricant). Generally, a heat seal may be used to adjoin the two blanks with one edge being oversized enough to create the fold over pocket.

FIG. 18A shows two blank configuration of the lubricant sheet assembly 1820 with two blanks 1806$_1$ and 1806$_2$ (purposefully exaggerated offset so a person of ordinary skill in the art can clearly see it) vs. a first meridian folded single blank. FIG. 18B shows the two blanks 1806$_1$ and 1806$_2$ being disposed in an overlapping configuration/manner (and heat sealed on three sides) to form the lubricant containment pocket 1802. Lubricant/oil 1804 is added prior to last fold and seal/last seal if lubricant/oil 1804 is added on an alternative edge. FIG. 18C shows the two blank configuration lubricant sheet assembly 1802 prior to the final seal (i.e., after putting in the oil/lubricant 1804).

For example, referring to FIGS. 18A-18C, the lubricant sheet assembly 1820 is configured to be used in the shredder S to provide lubrication between cutter elements CE of the shredder S. The lubricant sheet assembly 1820 comprises at least two blanks 1806$_1$ and 1806$_2$ of material overlapping each other to form the lubricant containment pocket 1802; the lubricant 1804 in the lubricant containment pocket 1802; and the primary barrier PB for the lubricant 1802, the primary barrier PB extending around and sealing the lubricant containment pocket 1802 so as to hold the lubricant 1804 in the lubricant containment pocket 1802. At least one of the blanks 1806$_1$ and 1806$_2$ of material folded along a fold line and comprising a fold of material along the fold line forming the secondary barrier SB for the lubricant 1804. When the lubricant 1804 in the lubricant containment pocket 1802 is being compressed during shredding of the lubricant sheet assembly 1820 so as to cause some of the lubricant 1804 to be released through the primary barrier PB, the secondary barrier SB is configured to deflect the released lubricant that is released towards the secondary barrier SB so as to relieve pressure in the released lubricant and to maintain the released lubricant in place for further lubrication of the cutter elements CE of the shredder S.

The at least two blanks may include a multitude of blanks. The multitude of blanks or the at least two blanks may be configured to be sealed as to the attributes that to form the lubricant containment pocket as well as the secondary barrier. In one embodiment, the multitude of blanks or the at least two blanks may include two blanks. In another embodiment, the multitude of blanks or the at least two blanks may include three or four blanks. The number of blanks in the multitude of blanks or the at least two blanks may vary.

In one embodiment, any heat seals represent an opportunity to incorporate a multitude of separate blanks or at least two blanks sealed together as to act as a blank in which to form the lubricant containment pocket, the primary seal/barrier PB and/or the secondary fold over seal/barrier SB.

FIGS. 5 and 6 show a lubricant sheet assembly 300 in accordance with yet another embodiment of the present patent application. The lubricant sheet assembly 300 is similar to that shown in FIGS. 1-2 and 3-4 except for the differences noted below.

The lubricant sheet assembly 300 may include additional fold over-barriers SB$_3$, SB$_4$ represented by the dotted fold line 308c, 308d on the shorter sides 316RS, 316LS of the lubrication sheet 320. These additional folds allow the lubrication sheet 320 to be inserted into the shredder on both short edges 316RS, 316LS since they all have the splash guard barriers SB$_3$, SB$_4$ that create pressure dispersing manifold 318$_3$, 318$_4$, (e.g., fold over is open on the right and left edges).

The cross-sectional view C (i.e., cross-sectional view taken along an axis C-C) in FIG. 6 illustrates how the additional folds 308c, 308d may be added onto the sides 316RS, 316LS of the lubricant sheet 320 so the lubricant sheet 320 may be inserted into the shredder on all four sides 316T, 316B, 316RS, 316LS due to the venting manifold features 318$_1$, 318$_2$, 318$_3$, 318$_4$ now residing on all the edges 316T, 316B, 316RS, 316LS of the lubricant sheet 320. FIG. 6 also shows the insertion directions of the lubricant sheet 320 into the shredder. That is, either one of the long edges 316B and 316T or one of the short edges 316RS and 316LS of the lubricant sheet 220 may be inserted into the shredder. All insertion edges 316B, 316T, 316RS and 316LS of the lubricant sheet 120 may be folded edges of the lubricant sheet assembly 100.

In the illustrated embodiment, the fold 308b is shown and disposed above the fold 308a (i.e., disposed/positioned between first area 313 and second area 315 of material 306) such that the fold 308a may form the secondary barrier SB$_1$ at the top long edge 316T and the fold 308b may form the secondary barrier SB$_2$ at the bottom long edge 316T. In another embodiment, the additional fold 308b may be disposed below the fold 308a. In such an embodiment, the fold 308a may form the secondary barrier SB$_2$ at the bottom long edge 316B and the fold 308b may form the secondary barrier SB$_1$ at the top long edge 316T.

In the illustrated embodiment, the material 306 includes additional material 306b, 306c, 306d that extends outwardly from the upper half of the material 306. The folds 308b, 308c, 308d may be formed on the additional material 306b, 306c, 306d disposed on the upper half of the material 306. In another embodiment, the material 306 includes additional material 306b, 306c, 306d that extends outwardly from the lower half of the material 306. In such an embodiment, the folds 308b, 308c, 308d may be formed on the additional material 306b, 306c, 306d disposed on the lower half of the material 306.

As may be seen in the cut-away view in FIG. 6, air may enter the venting manifold 318$_1$, 318$_2$, 318$_3$, 318$_4$ from the sides. Similar to the embodiments in FIGS. 1-2 or FIGS. 3-4, cuts into the fold may add additional pressure relieving vents, heat sealed patterns may redirect the released lubricant 304 and additional material to absorb and redistribute the released lubricant 304 may be added between the initial barriers PB$_1$, PB$_2$, PB$_3$, or PB$_4$ and the secondary barriers SB$_1$, SB$_2$, SB$_3$, or SB$_4$.

In one embodiment, referring to FIGS. 5-6, the material 360 of the sheet 306 adjacent the fold 308b, the material 364 of the sheet 306 adjacent the fold 308d, and the material 366 of the sheet 306 adjacent the fold 308c may each be folded onto portions 362 of the lubricant sheet 320. The material 360, the material 364, and the material 366 of the sheet 306 may each be then sealed to the lubricant sheet 320 using adhesives, tapes, heat seals, or other types of seals.

The fold of material may be a first fold (e.g., 308a) of material and the secondary barrier may be a first secondary barrier SB$_1$. The blank 106 of material may include at least one additional fold over material portion (e.g., 306b-306d) protruding outwardly from at least one side of either an upper half (e.g., including the area 313) of the blank 106 of material or a lower half (e.g., including the area 315) of the blank 106 of material. The at least one additional fold over material portion (e.g., 306b) may be folded over on to the blank 106 of material along at least one additional fold line AFL$_2$ forming a second secondary barrier SB$_2$. The first secondary barrier SB$_1$ and the second secondary barrier SB$_2$ may be disposed on opposing longitudinal ends LE$_1$ and LE$_2$ of the lubricant sheet 320.

The at least one additional fold over material portion may include three additional fold over material portions 306*b*-306*d*, the at least one additional fold line may include three additional fold lines $AFL_2$-$AFL_4$, and the at least one side may include three sides. Each of the three additional fold over material portions 306*b*-306*d* may protrude outwardly from a corresponding side of either the upper half (e.g., including the area 313) of the blank of material or the lower half (e.g., including the area 315) of the blank 106 of material and may be folded over on to the blank 106 of material along a corresponding additional fold line $AFL_2$-$AFL_4$ forming the second secondary barrier $SB_2$, a third secondary barrier $SB_3$, and a fourth secondary barrier $SB_4$, respectively. The third secondary barrier $SB_3$ and the fourth secondary barrier $SB_4$ may be disposed on opposing transverse ends $TE_1$ and $TE_2$ of the lubricant sheet.

Figure 7:
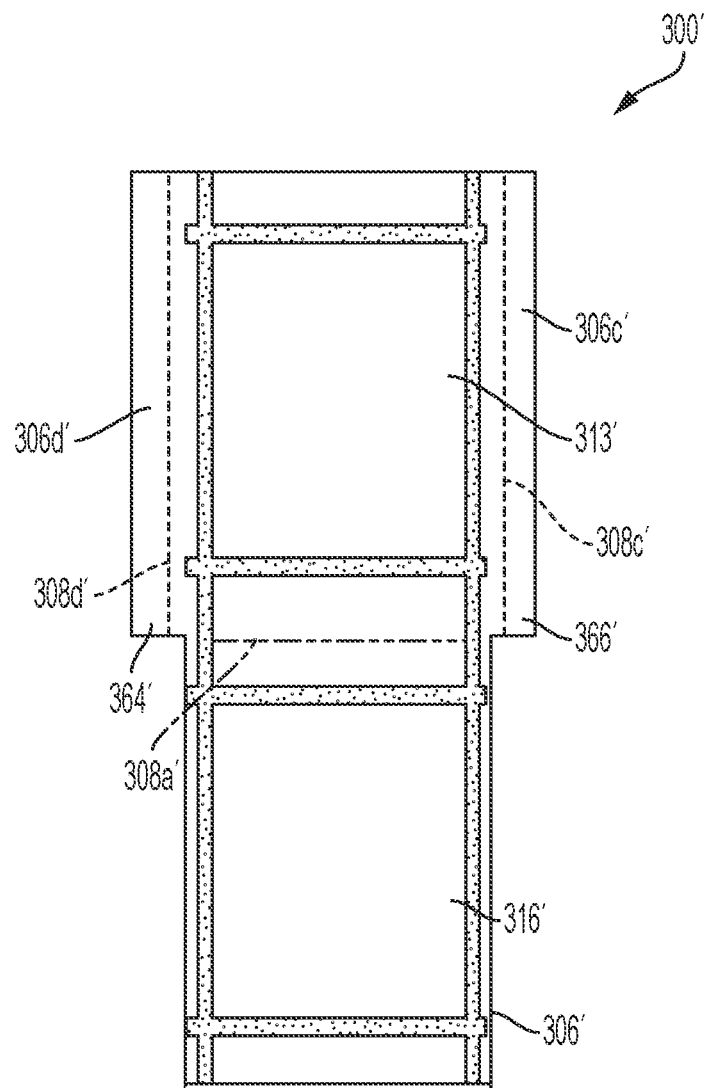
FIG. 7 shows a lubricant sheet assembly in accordance with yet another embodiment of the present patent application, where the lubricant sheet assembly is similar to that shown in FIG. 1-2 or 3-4 but includes three folds of material that are configured to form secondary barriers for any lubricant breaking through the seal of the cavity, and where the lubricant sheet assembly is in an initial, unfolded configuration.

FIG. 7 shows a lubricant sheet assembly 300' in accordance with yet another embodiment of the present patent application, where the lubricant sheet assembly 300' is similar to that shown in FIG. 1-2 or 3-4 but includes three folds of material that are configured to form secondary barriers for any lubricant breaking through the seal of the cavity, and where the lubricant sheet assembly is in an initial, unfolded configuration. For example, FIG. 7 is very similar to FIG. 5 but FIG. 7 has one main fold over and two side tab folds, while FIG. 5 has one main fold over and three tab folds (two side tab folds and one top tab fold).

Figure 8:
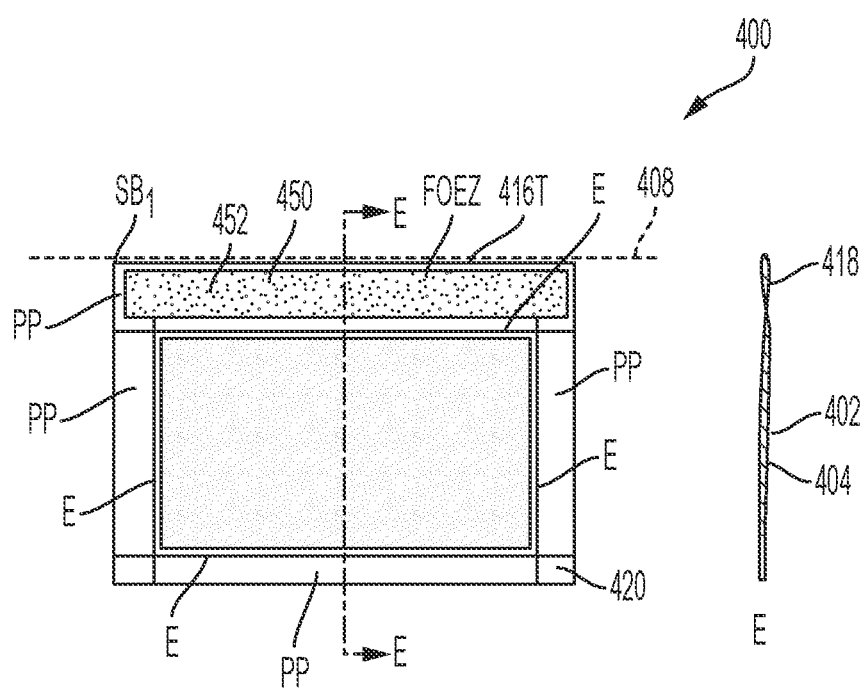
FIG. 8 shows a lubricant sheet assembly in accordance with yet another embodiment of the present patent application, where the lubricant sheet assembly is in a folded configuration and the lubricant sheet assembly includes an air passage manifold.
Figure 9:
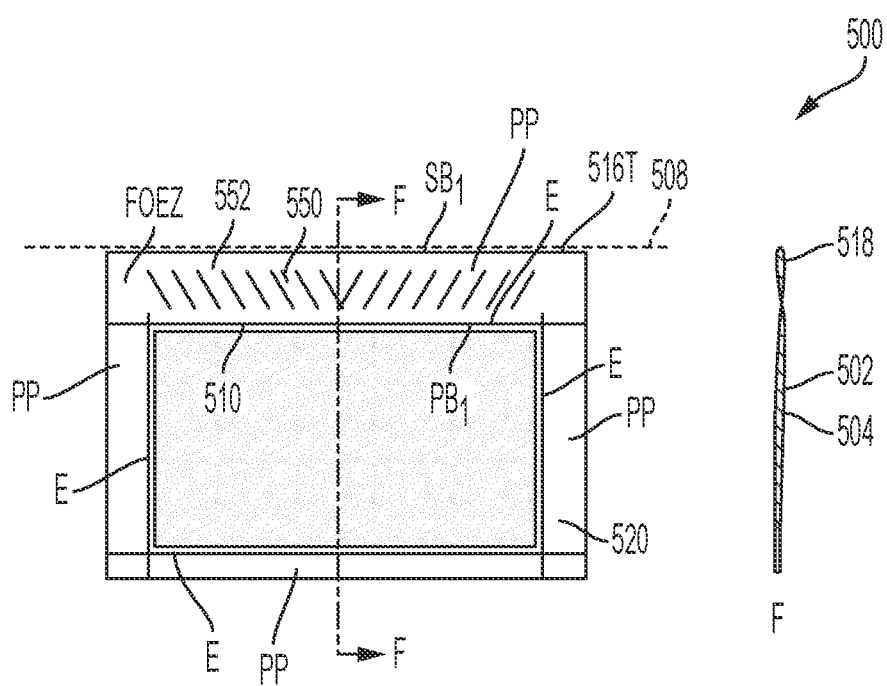
FIG. 9 shows a lubricant sheet assembly in accordance with yet another embodiment of the present patent application, where the lubricant sheet assembly is in a folded configuration and the lubricant sheet assembly includes a venting manifold area with directional heat seals that direct the lubricant once it has breached the initial containment seal.

FIGS. 8 and 9 show lubricant sheet assembly 400 and 500, respectively in accordance with other embodiments of the present patent application. The lubricant sheet assembly 400, 500 are in their folded configurations. FIGS. 8 and 9 show alternative seal (e.g., heat or other forms of seal) patterns 452, 552 that may be applied one edge at a time versus the previously shown enclosed box type seal as shown in and described with respect to FIGS. 5-6. Even though, in the illustrated embodiments of FIGS. 8 and 9, only one edge (e.g., upper edge 416T, 516T) has the fold over barrier SB1. In another embodiment, any and all sides of the lubrication sheet 420, 520 may be assembled as to have the fold over barrier features.

FIG. 8 shows how an additional material may be inserted, and may be spot sealed in place, with the material having additional properties. The cross-sectional view E (i.e., cross-sectional view taken along an axis E-E) of FIG. 8 illustrates how the additional folds may hold a carrier sheet 450. The front view of FIG. 8 also shows the fold over air passage manifold with the carrier material 450 within that space. If the material of the sheet is absorbent, the air passage or vent at the side edges can be eliminated so the material of the sheet may work with and without venting. The carrier sheet 450 can slow down or inhibit the flow of the lubricant, thus suppressing any squirting or splashing thereof.

FIG. 9 shows how a heat seal (or other type of seal) may deflect or act to create a convoluted tortuous path for the lubricant 504 when it has breached the initial seal 510/PB creating the containment pocket 502. The cross-sectional view F (i.e., cross-sectional view taken along an axis F-F) in FIG. 9 illustrates how the folded air passage manifold may have additional seals 552 to further control the flow of the lubricant 504 once it breaches the initial containment seal PB. The viscosity of lubricant (e.g., oil) may vary from liquid to gel like.

The embodiments of FIGS. 8 and 9 in which the fold over edge venting manifold area or zone FOEZ may have additional features such as directional heat seals 452, 552 that direct the lubricant 404, 504 once it has breached the initial containment seal PB. The embodiments of FIGS. 8 and 9 may also include a carrier sheet 450, 550 that is configured to absorb the lubricant 404, 504 and help to dispense the lubricant 404 onto the metal cutting tips and disk of the shredder. Furthermore, this additional carrier material 450, 550 may have other properties interspersed so as to sharpen the metal (such as iron oxide particles), may be formed so as to provide an additional type of lubricant like oil impregnated wax, may contain graphite, and/or may be of differing viscosities than what contained within the main sealed containment area 402, 502.

Figure 10:
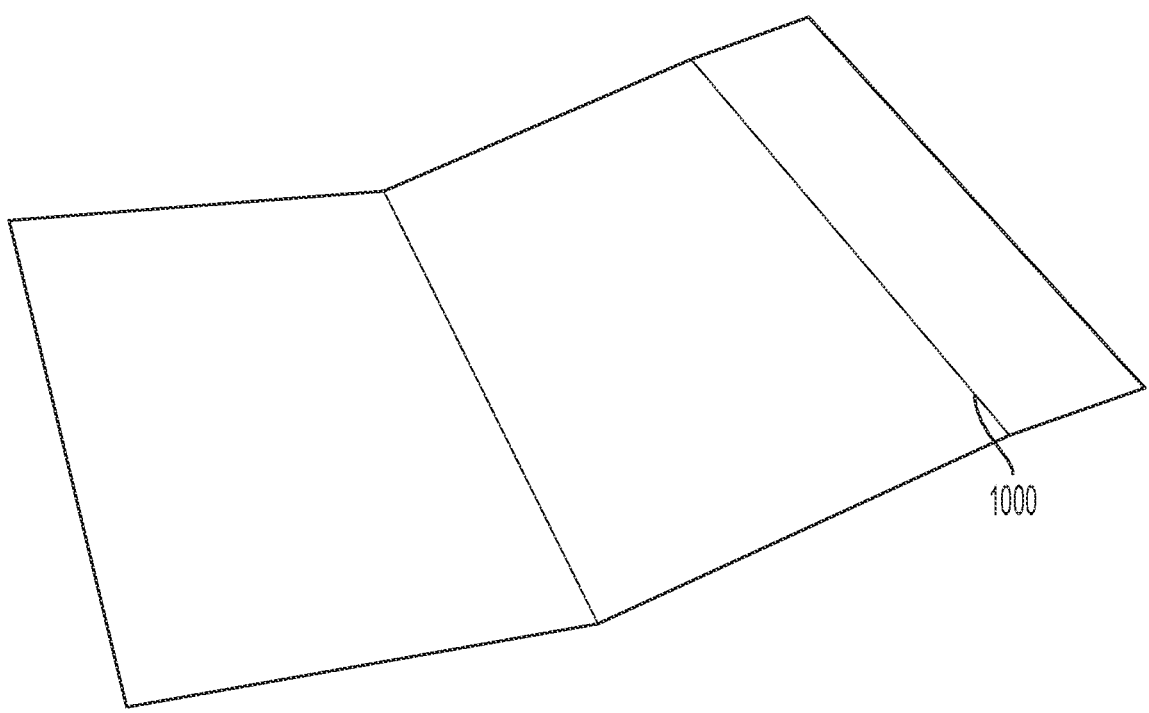
FIGS. 10-12 show illustrative representations of the prototypes of the lubricant sheet assembly in accordance with an embodiment of the present patent application, where
Figure 11:
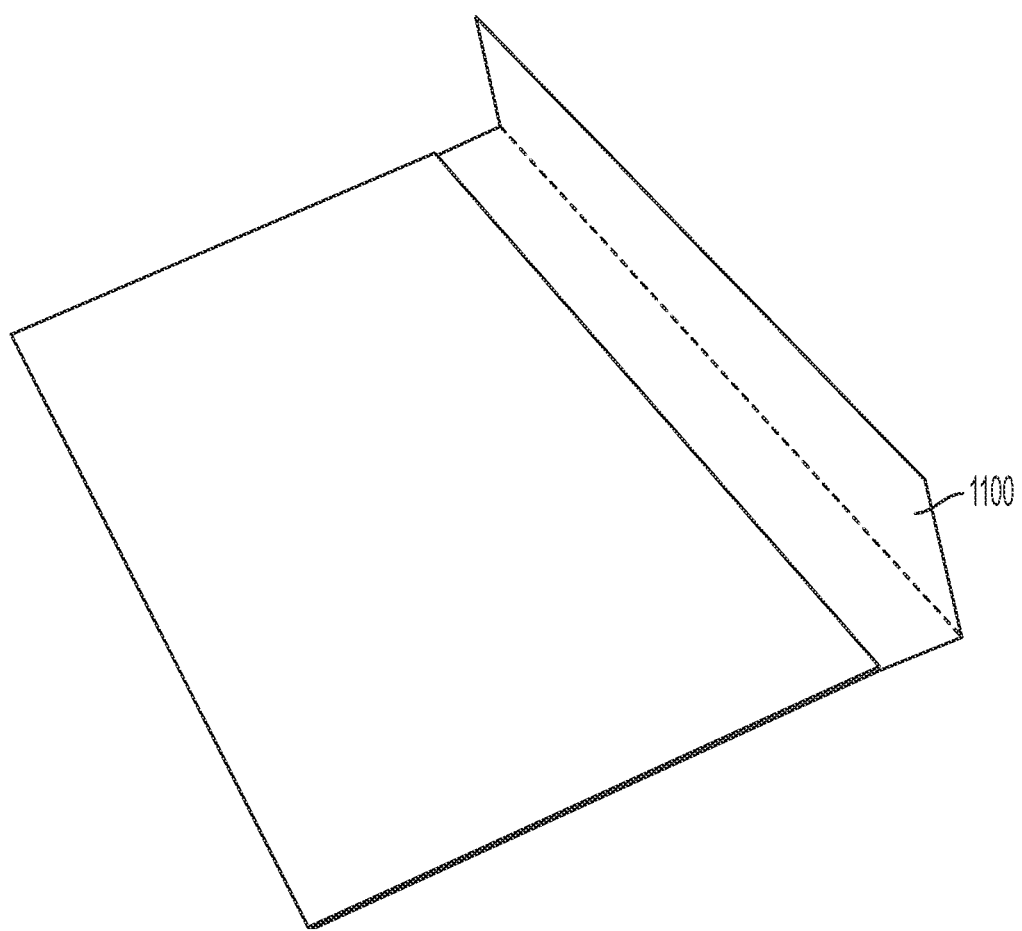
Figure 12:
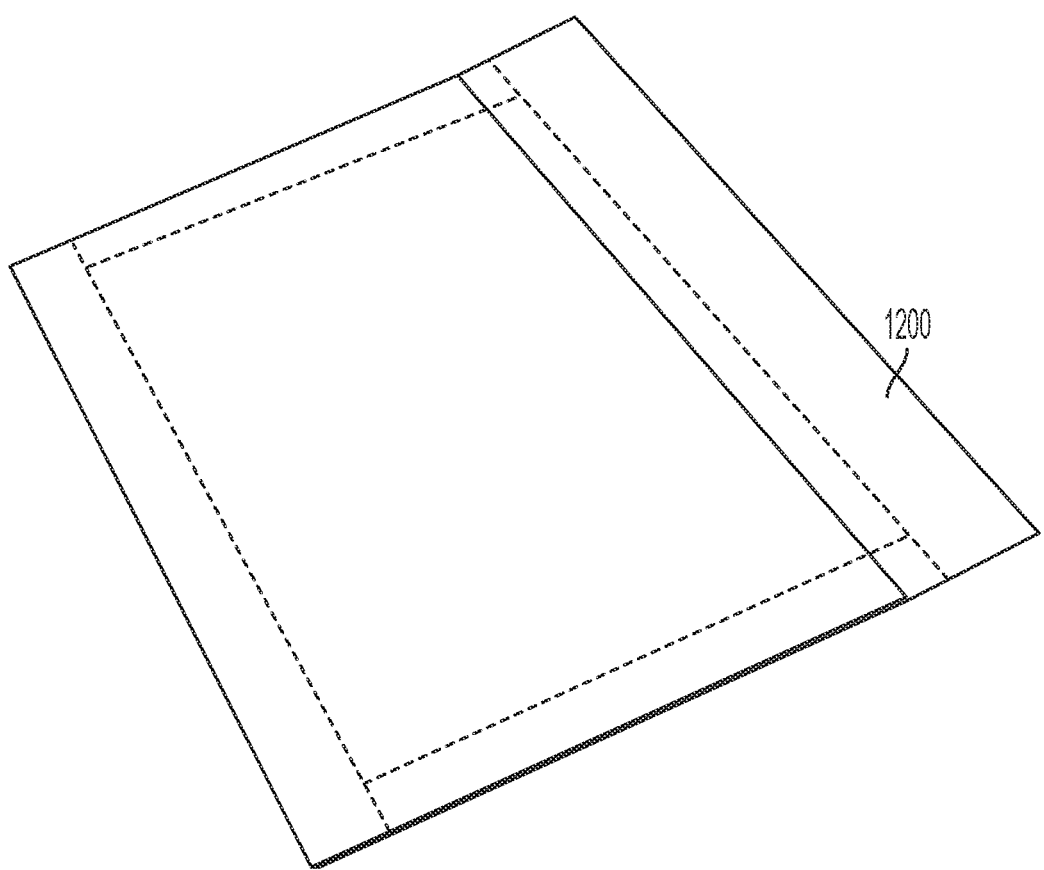

FIGS. 10-12 show illustrative representations of the prototypes of the lubricant sheet assembly in accordance with yet another embodiment of the present patent application, where FIG. 10 shows the cut down edge 1000, FIG. 11 shows a fold over edge 1100, and FIG. 12 shows a loosely taped fold over edge 1200.

Figure 13:
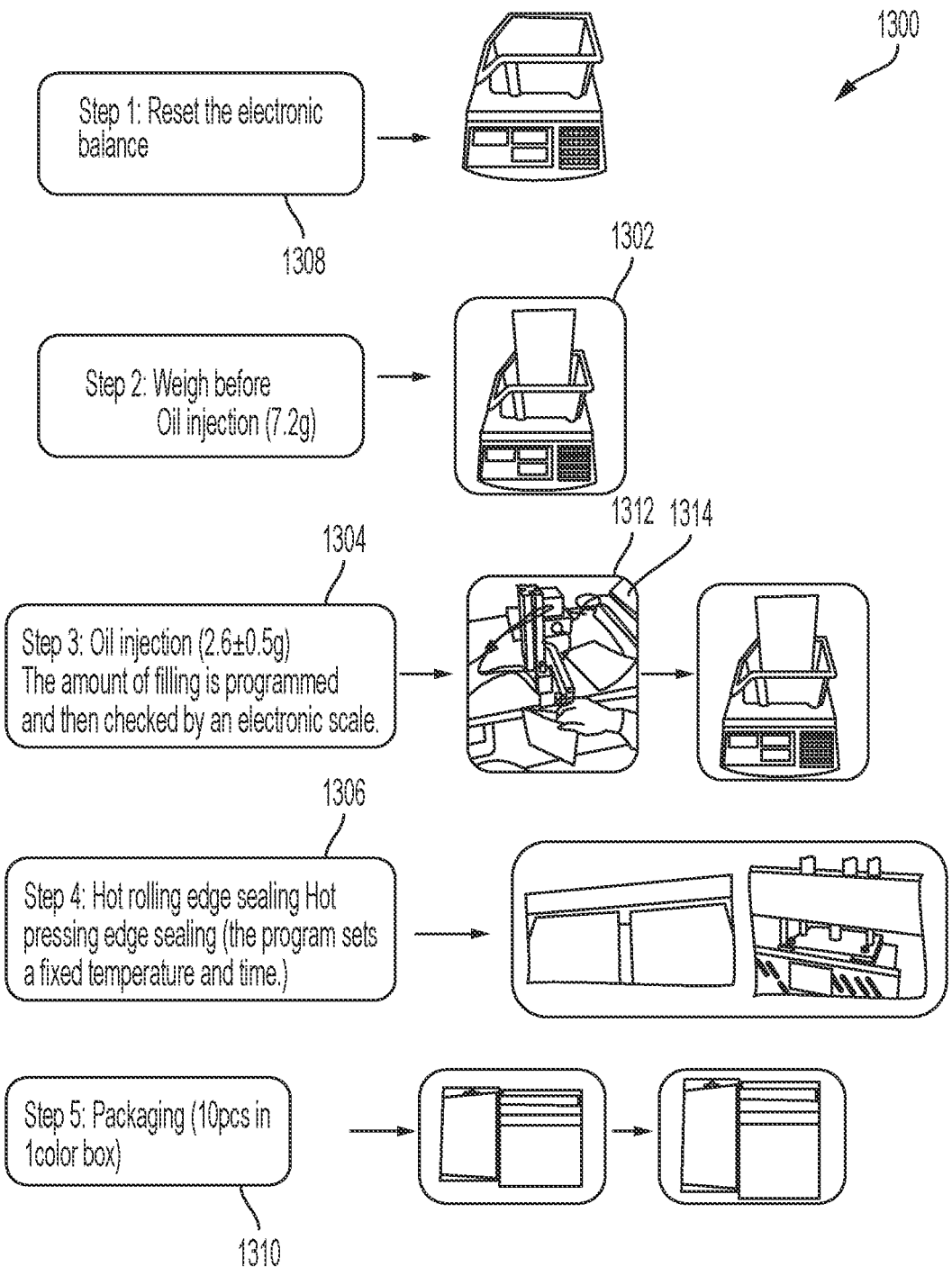
FIG. 13 shows a flow chart with various production procedures for the lubricant sheet assembly in accordance with an embodiment of the present patent application.
Figure 16A:
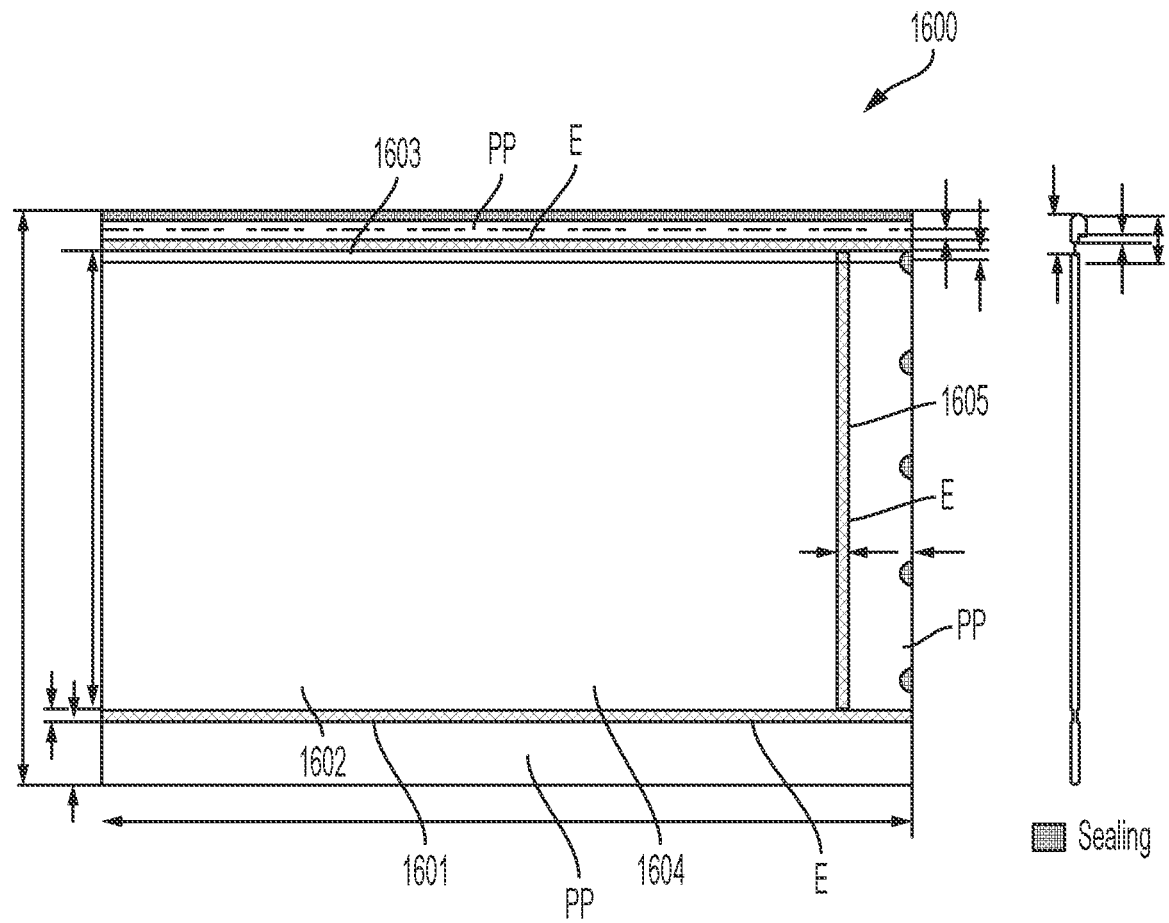
FIGS. 16A and 16B show the lubricant sheet assembly with three sides sealed, prior to adding lubricant to a lubricant containment pocket, and prior to sealing the fourth side in accordance with an embodiment of the present patent application.
Figure 16B:
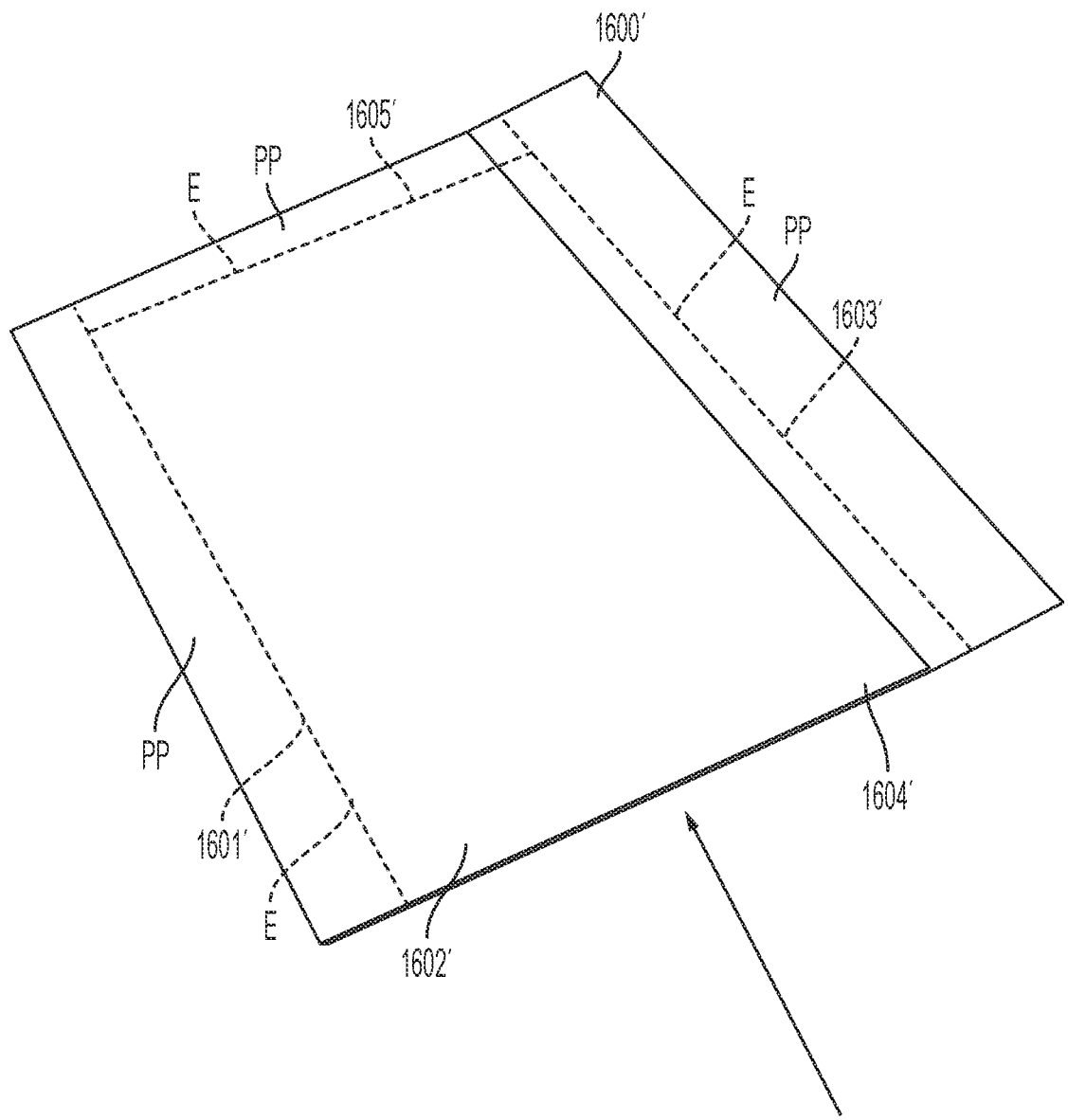
Figure 17:
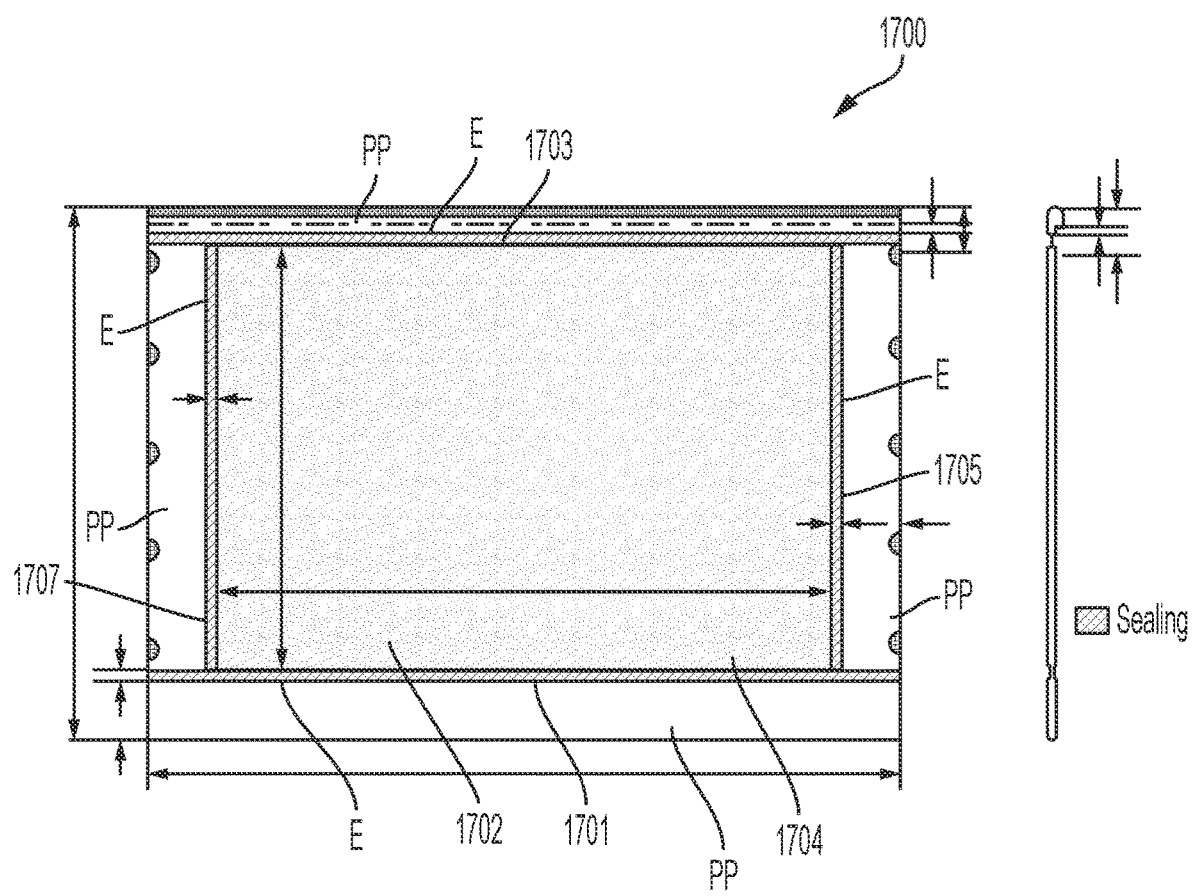
FIG. 17 shows the lubricant sheet assembly after the lubricant is added to the lubricant containment pocket and after sealing the fourth side thereof in accordance with an embodiment of the present patent application.

FIG. 13 shows a flow chart with various production procedures 1300 for the lubricant sheet or a method 1300 for forming a lubricant sheet in accordance with an embodiment of the present patent application. The production procedures may include a procedure 1302 of weighing the lubricant sheet before adding the lubricant to the lubricant containment pocket, and a procedure 1304 of adding/injecting lubricant to/into the lubricant containment pocket. In one embodiment, the weight of the lubricant sheet before adding the lubricant to the lubricant containment pocket is approximately 7.2 grams. In one embodiment, the lubricant sheet (i.e., before adding the lubricant to the lubricant containment pocket) includes three sealed sides with the fourth side open and configured to receive lubricant therethrough. This is also shown in FIGS. 16A, 16B and 17. The production procedures may also include a procedure 1306 of hot rolling edge sealing or hot pressing edge sealing the fourth edge of the lubricant containment pocket (i.e., after the lubricant is added or injected into the lubricant containment pocket).

A system 1312 with a controller 1314 may be programmed to add/inject a predetermined amount of injecting lubricant to/into the lubricant containment pocket and to check the weight of the lubricant sheet before and/or after adding/injecting the lubricant to/into the lubricant containment pocket. In one embodiment, the weight of the lubricant added to the lubricant containment pocket is approximately 2.6 grams. In another embodiment, the weight of the lubricant added to the lubricant containment pocket is in the range between approximately 2.1 grams and approximately 3.1 grams.

The system may also be configured to perform hot rolling edge sealing or hot pressing edge sealing the fourth edge of the lubricant containment pocket. The system may also be configured to carry out the hot rolling edge sealing or hot pressing edge sealing the fourth edge of the lubricant containment pocket at a predetermined temperature and for a predetermined time.

The production procedures may optionally include a procedure 1308 of resetting the electronic balance before weighing the lubricant sheet (i.e., before adding the lubricant to the lubricant containment pocket). The production procedures may optionally include a procedure 1310 of packaging the lubricant sheets (e.g., 10 lubricant sheets in one box).

Referring to FIG. 16B, when the lubricant is added to the lubricant containment pocket with three heat sealed sides, the lubricant is added, for example, from an open side designated by the arrow. Once the lubricant is added to the lubricant containment pocket, the fourth/open side of the lubricant containment pocket is also sealed in the final sealing stage/procedure. In one embodiment, the order of the open/fourth side of the lubricant containment pocket may be changed. For example, the bottom side of the lubricant containment pocket/lubricant sheet may be the open/fourth side of the lubricant containment pocket through which the lubricant is added to the lubricant containment pocket. In another embodiment, the upper/bottom flap/fold over side may be the final side but the lubricant sheet would then be filled when the lubricant sheet is in landscape position (wider than taller).

Figure 14:
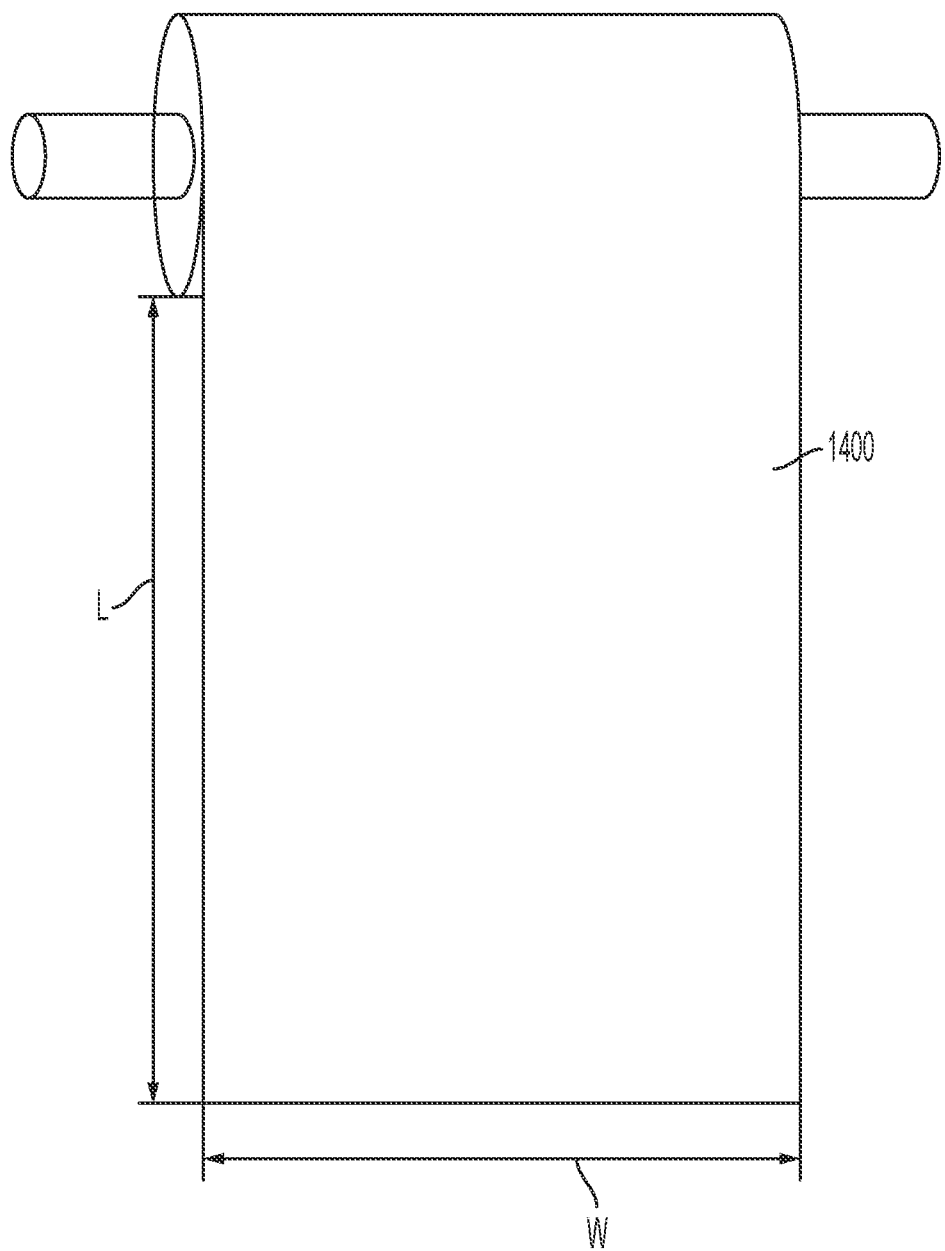
FIG. 14 shows a raw material of the lubricant sheet assembly in accordance with an embodiment of the present patent application.

FIG. 14 shows a raw material 1400 of the lubricant sheet in accordance with an embodiment of the present patent application. The raw material may be in the form of a roll. In one embodiment, the width W of the raw material 1400 is approximately 630 millimeters. The raw material having a length L of 850 millimeters may be cut to form the lubricant sheet.

Figure 15:
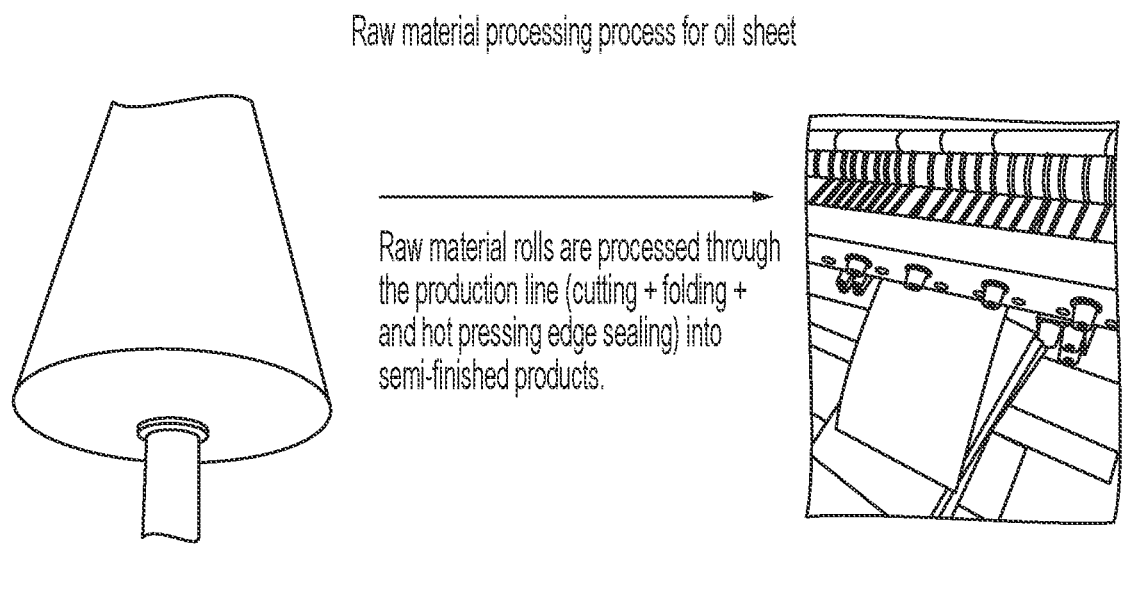
FIG. 15 shows raw material processing procedures of the lubricant sheet assembly in accordance with an embodiment of the present patent application.

FIG. 15 shows raw material processing procedures of the lubricant sheet in accordance with an embodiment of the present patent application. The raw material rolls may be processed through the production line. The raw material processing procedures of the lubricant sheet may include cutting the desired length of the raw material from the raw material roll (as the width remains constant for the raw material roll), folding the lubricant sheet along a fold line into a folded configuration, and then hot pressing edge sealing three sides of the lubricant containment pocket with the fourth side of the lubricant containment pocket left open to receive lubricant therethrough.

FIGS. 16A and 16B show the lubricant sheet assembly 1600, 1600' with three sides 1601/1601', 1603/1603', and 1605/1605' sealed, prior to adding lubricant 1604/1604' to a lubricant containment pocket 1602/1602', and prior to sealing the fourth side 1607/1607' in accordance with an embodiment of the present patent application.

FIG. 17 shows the lubricant sheet assembly 1700 after the lubricant 1704 is added to the lubricant containment pocket 1702 and after sealing the fourth side 1707 thereof in accordance with an embodiment of the present patent application.

In one embodiment, dimensions noted in the present patent application may be up to 5 percent, 10 percent, 15 percent or 20 percent greater than or up to 5 percent, 10 percent, 15 percent or 20 percent less than the values described throughout the present patent application. In another embodiment, dimensions noted in the present patent application may be in the range of +/−5 percent, +/−10 percent, +/−15 percent or +/−20 percent of the values described throughout the present patent application.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The illustration of the embodiments of the present patent application should not be taken as restrictive in any way since a myriad of configurations and methods utilizing the present patent application can be realized from what has been disclosed or revealed in the present patent application. The systems, features and embodiments described in the present patent application should not be considered as limiting in any way. The illustrations are representative of possible construction and mechanical embodiments and methods to obtain the desired features. The location and/or the form of any minor design detail or the material specified in the present patent application can be changed and doing so will not be considered new material since the present patent application covers those executions in the broadest form.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing illustrated embodiments have been provided to illustrate the structural and functional principles of the present patent application and are not intended to be limiting. To the contrary, the present patent application is intended to encompass all modifications, alterations and substitutions within the spirit and scope of the appended claims.

What is claimed is:

1. A lubricant sheet configured to be used in a shredder to provide lubrication between cutter elements of the shredder, the lubricant sheet comprising:
   a blank of material folded along a fold line into a folded configuration to form a lubricant containment pocket;
   a lubricant in the lubricant containment pocket; and
   a primary barrier for the lubricant, the primary barrier extending around and sealing the lubricant containment pocket so as to hold the lubricant in the lubricant containment pocket;
   the blank of material comprising a fold of material along the fold line forming a secondary barrier for the lubricant,
   wherein the secondary barrier is configured to deflect lubricant that is released from the lubricant containment pocket through the primary barrier and towards the secondary barrier in response to being compressed during shredding of the lubricant sheet so as to relieve pressure in the released lubricant and to maintain the released lubricant in place for further lubrication of the cutter elements of the shredder.

2. The lubricant sheet of claim 1, wherein the blank of material includes peripheral portions extending peripherally around the primary barrier, and
   wherein the secondary barrier and each of a peripheral portion of the peripheral portions between the primary barrier and the secondary barrier form a manifold for the released lubricant.

3. The lubricant sheet of claim 2, wherein the manifold having lateral edges, the manifold is open on the lateral edges so as to equalize any pressure buildup of the released lubricant and so as to enable venting of the released lubricant along a longitudinal direction of the fold of material and in a plane of the blank of material.

4. The lubricant sheet of claim 2, wherein the manifold includes directional seals that are configured to direct or deflect the released lubricant.

5. The lubricant sheet of claim 2, wherein the manifold includes directional seals that are configured to form a convoluted tortuous path for the released lubricant.

6. The lubricant sheet of claim 2, wherein the manifold includes pressure relieving vents that are configured to relieve the pressure in the released lubricant.

7. The lubricant sheet of claim 2, wherein the manifold includes a material that is configured to absorb and redistribute the released lubricant so as to slow down or inhibit flow of the released lubricant.

8. The lubricant sheet of claim 1, wherein the fold of the material is disposed between a first area of the blank of material and a second area of the blank of material,
   wherein the first area and the second area form surfaces of the lubricant containment pocket,
   wherein each of the first area and the second area have edges,
   wherein the edges of the first area and the edges of the second area correspond to each other and together form edges of the lubricant containment pocket, and
   wherein the primary barrier is formed along the edges of the lubricant containment pocket.

9. The lubricant sheet of claim 8, wherein the fold of material is a first fold of material and the secondary barrier is a first secondary barrier,
   wherein the blank of material includes a second fold line that is disposed either above the first area or below the second area of the blank of material,
   wherein the blank of material includes a second fold of material along the second fold line forming a second secondary barrier for the lubricant, and
   wherein the first secondary barrier and the second secondary barrier are disposed on opposing longitudinal ends of the lubricant sheet.

10. The lubricant sheet of claim 8, wherein the fold of material is a first fold of material and the secondary barrier is a first secondary barrier,
    wherein the blank of material includes at least one additional fold over material portion protruding outwardly from at least one side of either an upper half of the blank of material or a lower half of the blank of material,
    wherein the at least one additional fold over material portion folded over on to the blank of material along at least one additional fold line forming a second secondary barrier, and
    wherein the first secondary barrier and the second secondary barrier are disposed on opposing longitudinal ends of the lubricant sheet.

11. The lubricant sheet of claim 10, wherein the at least one additional fold over material portion includes three additional fold over material portions, the at least one additional fold line includes three additional fold lines, and the at least one side includes three sides,
    each of the three additional fold over material portions protrudes outwardly from a corresponding side of either the upper half of the blank of material or the lower half of the blank of material,
    each of the three additional fold over material portions is folded over on to the blank of material along a corresponding additional fold line forming the second secondary barrier, a third secondary barrier, and a fourth secondary barrier, respectively, and
    wherein the third secondary barrier and the fourth secondary barrier are disposed on opposing transverse ends of the lubricant sheet.

12. A lubricant sheet assembly configured to be used in a shredder to provide lubrication between cutter elements of the shredder, the lubricant sheet assembly comprising:
    at least two blanks of material overlapping each other to form a lubricant containment pocket;
    a lubricant in the lubricant containment pocket; and
    a primary barrier for the lubricant, the primary barrier extending around and sealing the lubricant containment pocket so as to hold the lubricant in the lubricant containment pocket;
    at least one of the blanks of material folded along a fold line and comprising a fold of material along the fold line forming a secondary barrier for the lubricant,
    wherein the secondary barrier is configured to deflect lubricant that is released from the lubricant containment pocket through the primary barrier and towards the secondary barrier in response to being compressed during shredding of the lubricant sheet assembly so as to relieve pressure in the released lubricant and to maintain the released lubricant in place for further lubrication of the cutter elements of the shredder.

* * * * *